US010278533B2

(12) United States Patent
Angell et al.

(10) Patent No.: US 10,278,533 B2
(45) Date of Patent: May 7, 2019

(54) COLD BREW SYSTEM

(71) Applicant: BUNN-O-MATIC CORPORATION, Springfield, IL (US)

(72) Inventors: Jonathan Russell Angell, Springfield, IL (US); John Douglas Bishop, Springfield, IL (US); Chairil McClain, Springfield, IL (US); Karalynn M. McDermott, Springfield, IL (US); Charles H. Clark, Springfield, IL (US); Kenneth John Benson, Springfield, IL (US); Matthew Christopher Humphrey, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 15/565,102

(22) PCT Filed: Apr. 8, 2016

(86) PCT No.: PCT/US2016/026752
§ 371 (c)(1),
(2) Date: Oct. 6, 2017

(87) PCT Pub. No.: WO2016/164796
PCT Pub. Date: Oct. 13, 2016

(65) Prior Publication Data
US 2018/0098658 A1 Apr. 12, 2018

Related U.S. Application Data

(60) Provisional application No. 62/144,719, filed on Apr. 8, 2015, provisional application No. 62/198,750, filed
(Continued)

(51) Int. Cl.
*A47J 31/00* (2006.01)
*A47J 31/24* (2006.01)
(Continued)

(52) U.S. Cl.
CPC ............. *A47J 31/002* (2013.01); *A47J 31/24* (2013.01); *A47J 31/44* (2013.01); *A47J 31/46* (2013.01); *A47J 31/467* (2013.01)

(58) Field of Classification Search
CPC .......... A47J 31/002; A47J 31/24; A47J 31/44; A47J 31/46
See application file for complete search history.

(56) References Cited

U.S. PATENT DOCUMENTS

| 2,741,976 A | 3/1952 | Faber |
| 2,878,746 A | 3/1959 | Schwinger |
(Continued)

FOREIGN PATENT DOCUMENTS

| CN | 204133216 U | 2/2015 |
| DE | 3318317 | 11/1984 |
(Continued)

OTHER PUBLICATIONS

Search Report and Written Opinion issued in App. No. PCT/US2016/026752 (dated 2016).
(Continued)

*Primary Examiner* — Anthony J Weier
(74) *Attorney, Agent, or Firm* — Barnes & Thornburg LLP

(57) ABSTRACT

A cold beverage brewing system includes a container and a supply of water. The container holds a brewing substance which forms a brewed beverage when combined with the water. The water supplied to the container for brewing can be at a variety of temperatures, including ambient or below ambient temperatures. The system is controllably pressurized with a gas, preferably nitrogen, and controllably dispensed to provide a brewed beverage with selected characteristics in a relatively short period of time.

10 Claims, 19 Drawing Sheets

Related U.S. Application Data on Jul. 30, 2015, provisional application No. 62/264,100, filed on Dec. 7, 2015, provisional application No. 62/301,402, filed on Feb. 29, 2016.

(51) Int. Cl.
*A47J 31/44* (2006.01)
*A47J 31/46* (2006.01)

(56) References Cited

U.S. PATENT DOCUMENTS

| | | | |
|---|---|---|---|
| 3,682,649 | A | 8/1972 | Orozovich |
| 3,700,466 | A | 10/1972 | Bergeron et al. |
| 3,790,689 | A | 2/1974 | Pitchon et al. |
| 4,669,639 | A | 6/1987 | Klarenbach et al. |
| 5,337,652 | A | 8/1994 | Fischer et al. |
| 5,803,320 | A | 9/1998 | Cutting et al. |
| 7,100,799 | B2 | 9/2006 | Gruenewald et al. |
| 7,419,692 | B1 | 9/2008 | Kalenian |
| 7,832,329 | B2 | 11/2010 | Crescenzi |
| 7,858,138 | B2 * | 12/2010 | Gehrig .................... A23F 3/366 426/425 |
| 8,469,235 | B2 | 6/2013 | Lion |
| 8,635,944 | B2 | 1/2014 | Buchholz et al. |
| 2008/0196593 | A1 | 8/2008 | Shrader et al. |
| 2008/0280023 | A1 | 11/2008 | Kalenian |
| 2010/0034942 | A1 | 2/2010 | Illy et al. |
| 2010/0162899 | A1 | 7/2010 | O'Brien |
| 2010/0263545 | A1 | 10/2010 | Morgan et al. |
| 2012/0219686 | A1 | 8/2012 | Bombeck et al. |
| 2013/0136833 | A1 | 5/2013 | Vastardis et al. |
| 2015/0017297 | A1 | 1/2015 | Vastardis et al. |
| 2016/0007626 | A1 | 1/2016 | Choi et al. |
| 2016/0015204 | A1 | 1/2016 | Belanich et al. |

FOREIGN PATENT DOCUMENTS

| | | |
|---|---|---|
| DE | 19706005 | 8/1998 |
| EP | 1428791 | 6/2004 |
| EP | 1486432 | 12/2004 |
| EP | 2524635 | 6/2014 |
| JP | H02-138938 | 5/1990 |
| KR | 10-1448230 | 10/2014 |

OTHER PUBLICATIONS

Hoffmann, "Pressurized Cold Brewing," obtained from the Internet at: http://www.jimseven.com/2010/08/20/pressurised-cold-brewing/ (Aug. 20, 2010).
Supplementary Search Report issued in App. No. EP16777409 (dated Dec. 5, 2018).

* cited by examiner

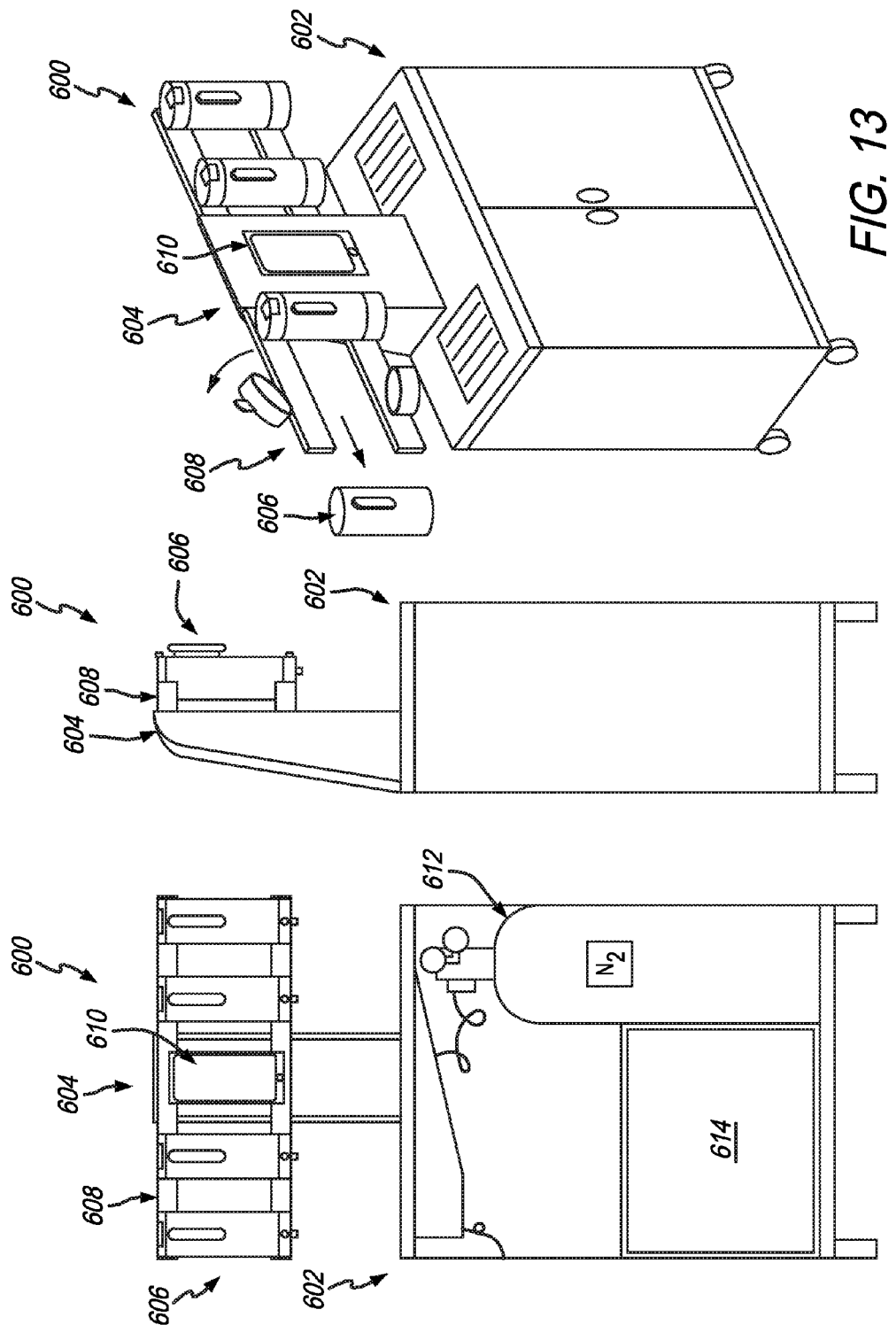

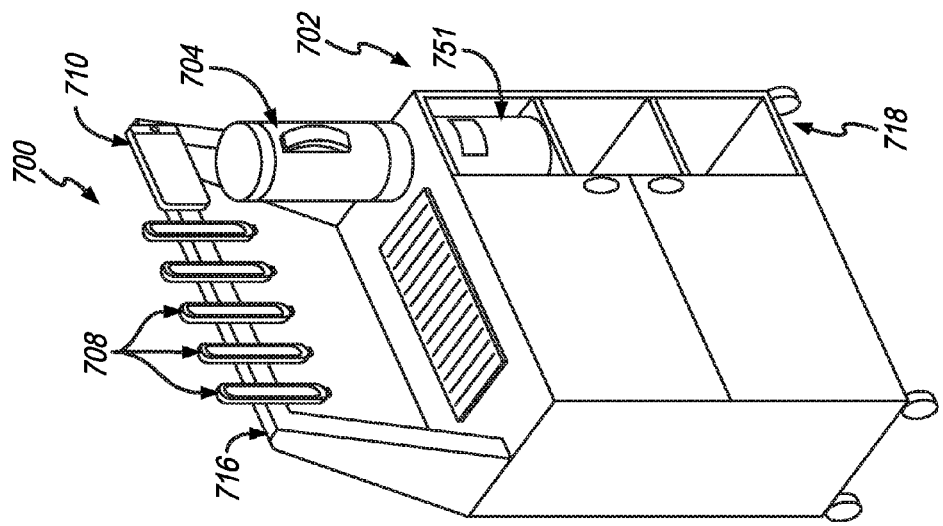
FIG. 16
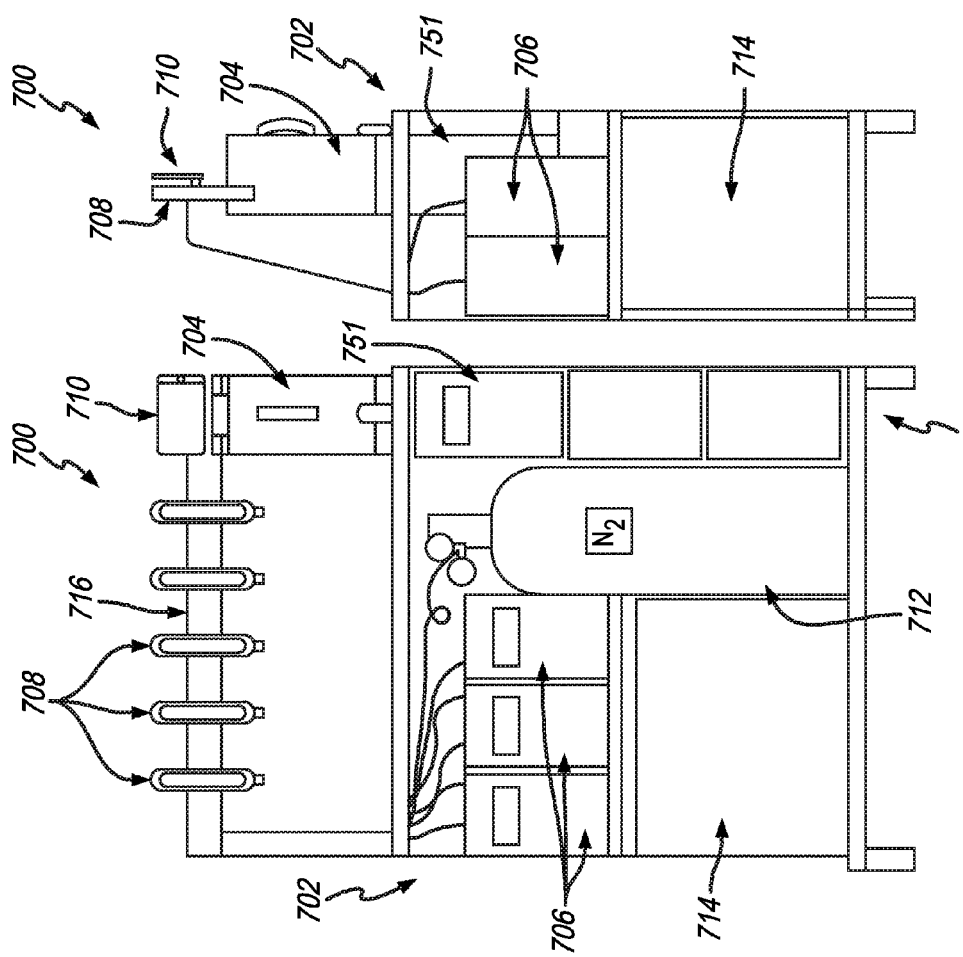
FIG. 15
FIG. 14

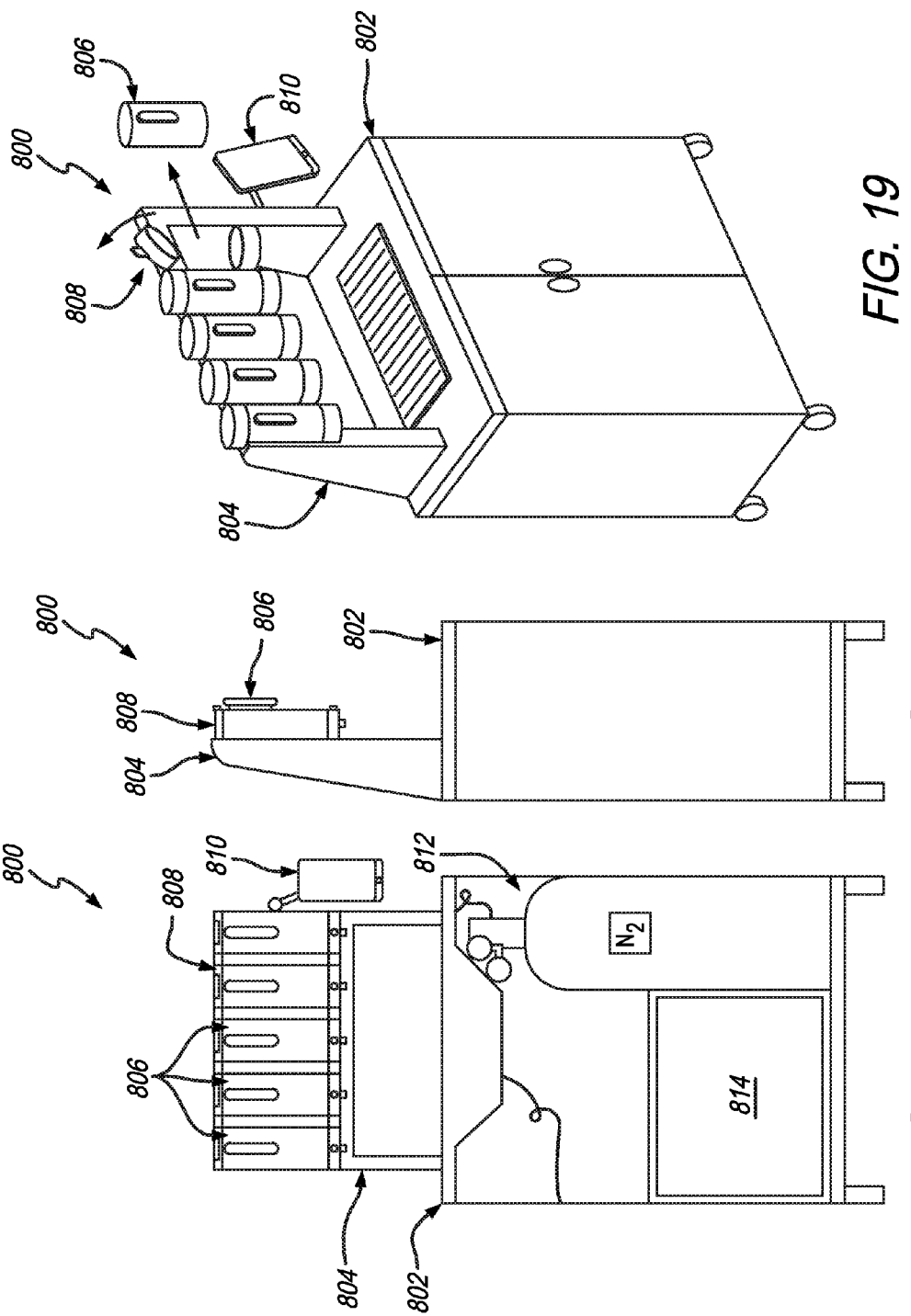

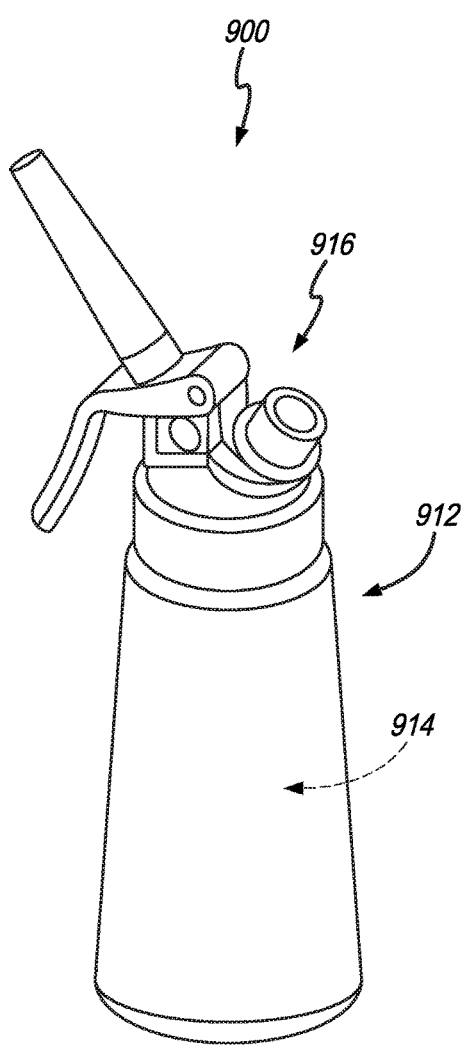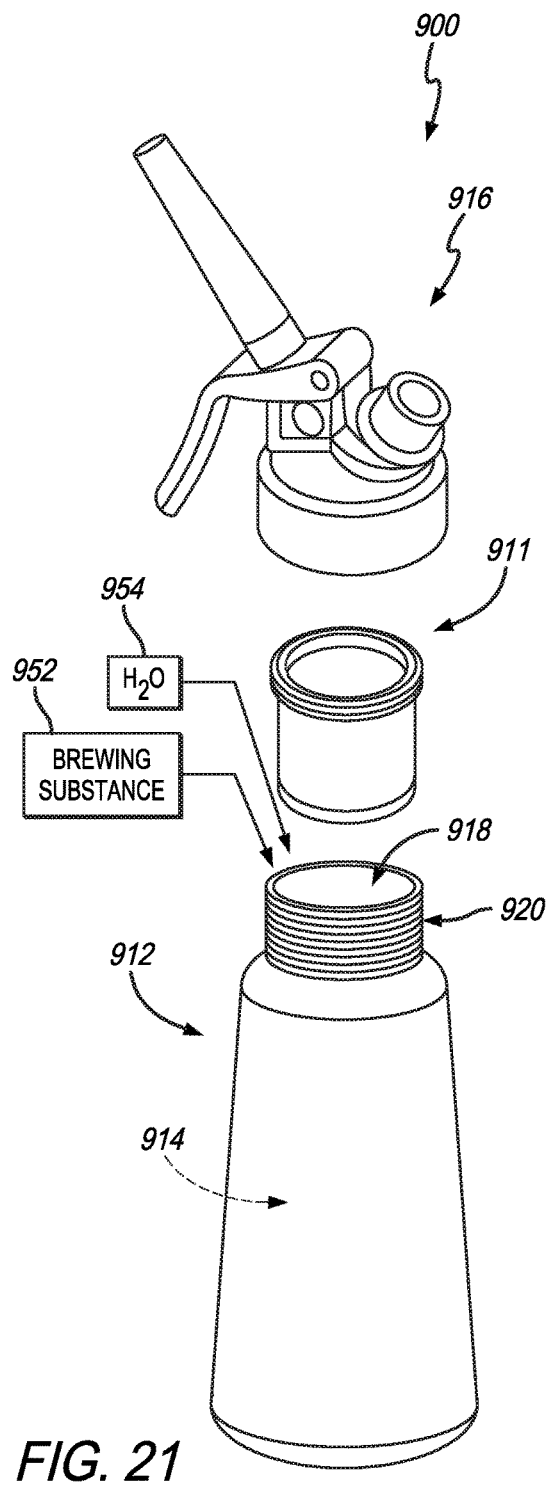
FIG. 20
FIG. 21

COLD BREW SYSTEM

CROSS REFERENCE TO RELATED APPLICATIONS

This application is a U.S. nationalization under 35 U.S.C. § 371 of International Application No. PCT/US2016/026752, filed Apr. 8, 2016, which is related to and claims priority from U.S. Application No. 62/144,719, filed Apr. 8, 2015, U.S. Application No. 62/198,750, filed Jul. 30, 2015, U.S. Application No. 62/264,100, filed Dec. 7, 2015, and U.S. Application No. 62/301,402, filed Feb. 29, 2016. The disclosures set forth in the referenced applications are incorporated herein by reference in their entireties.

FIELD OF THE DISCLOSURE

The present disclosure relates to a beverage brewing system and method, and particularly to a coffee brewing system and method. More particularly, the present disclosure relates to a coffee brewing system and method using low temperature liquid.

BACKGROUND

A variety of brewing techniques have been developed to extract flavors, substances and other characteristics from beverage brewing substances. Such beverage brewing substances can include coffee, tea, tisanes, herbal, botanical, and a variety of other substances. Generally, brewing techniques involve infusing such brewing substances with water or another liquid or combination of liquids to extract the desired characteristics from the brewing substance and essentially infuse the brewing liquid with those substances and characteristics. The substances may include volatiles, caffeine, color chemicals, aroma producing chemicals, as well as finer particles. The substances and particles can contribute to the desired flavors, aromas, as well as mouth feel of the resultant beverage. The resulting beverage can be used either directly as a beverage for consumption "as is" or as a component of another beverage such as may be achieved by dilution, mixing with other substances such as milk, soy milk, sugar, or other flavorings whether generally in a solid or liquid form.

A wide variety of brewing techniques have been developed using hot liquids in combination with the brewing substance as well as ambient or chilled temperature liquids. The different brewing techniques can be used to produce different resultant beverages. For example, chilled or "cold brew" beverages might have a different chemical makeup or different chemical composition that some people using this technique suggest produces lower acidity in the finished beverage. One form of cold brewing technique is referred to as "Toddy" which uses a volume of beverage brewing substance retained in a filter device in combination with ambient or chilled liquid dispensed into the beverage brewing substance. The containers associated with this brewing technique are of sufficient size and dimension to permit combination of these ingredients to produce a desired resultant volume of cold brewed coffee. This technique can be quite time consuming taking approximately 12-24 hours to produce a batch of finished brewed coffee. This technique steeps or soaks ground coffee over a long period of time in a large volume container such as a bucket and requires draining and filtering after the steeping period. This technique can result in unpredictability and waste due to making a large volume of coffee well in advance of the time it is used. If more coffee is needed during the dispensing time it cannot be made quickly due to the long steep time. If less is needed the remainder will be wasted.

Other cold brewing techniques may use a controlled slow dispensing or drip dispensing of ambient or chilled water onto a beverage brewing substance over an extended period of time to limit the contact time the water has with the beverage brewing substance as it passes through the beverage brewing substance and the filter for subsequent dispensing into a collection container. This technique may be different from the Toddy technique in that the Toddy technique tends to combine a larger volume of water with the beverage brewing substance resulting in longer contact time between the water and the beverage brewing substance.

It would be desirable to provide a system, method and apparatus for cold brewing beverages, such as coffee, to produce a resultant beverage in a shorter period of time. It would also be desirable to provide enhanced control of the brewing operation to control the resulting characteristics of the beverage.

This background information is believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIGS. 11, 12, and 13 illustrate another embodiment of a beverage-delivery system;

FIGS. 14, 15, and 16 illustrate another embodiment of a beverage-delivery system;

FIGS. 17, 18, and 19 illustrate another embodiment of a beverage-delivery system;

FIG. 20 is a perspective view of another embodiment of a cold brew system which allows for brewing and dispensing of a brewed beverage in a hand-held unit;

FIG. 21 is an exploded perspective view of the cold brew system of FIG. 20;

Figure 1:
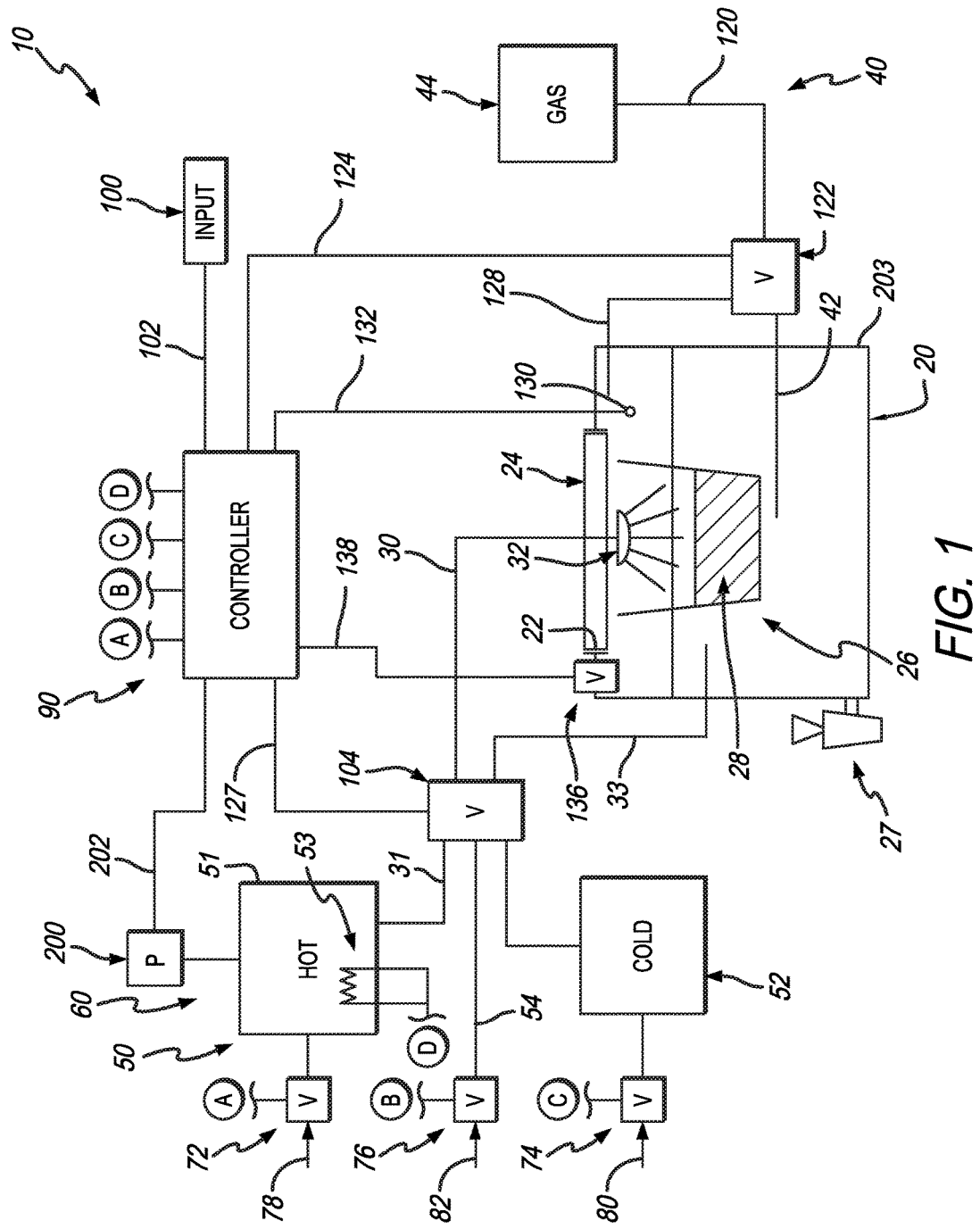
FIG. 1 is a general diagrammatic view of one embodiment of a cold brew system which retains a beverage brewing substance within a filter device for a combination with water in a controlled manner to combine water with the beverage brewing substance to produce a beverage, the brewing of the beverage occurring within a pressurized environment using both heated and unheated water.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating, or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried, or other forms of materials including liquid, gel, crystal, or other forms of beverage or food materials to obtain a desired beverage or other food product.

Brewing substances will be described in the present application and will be generally referred to as "coffee". However, it is understood that any variety of brewing substances could be used in place of coffee or in combination with coffee. The term coffee is intended to be used as an expedient while describing this process with the understanding that other substances may be used and the use of the term "coffee" is not intended to be limiting on the disclosure or the scope set forth in the claims, unless specifically limited by the claims. It should be understood that the term brewing substance should be broadly interpreted regardless of reference to brewing substance or coffee. Also, the characteristics or form of the brewing substance can be any variety of ingredients which are currently known or hereafter developed. The form of the brewing substance may include powder, liquid, gel, crystal, flake, freeze-dried and any other form or state regardless of temperature, phase, or other characteristics. Reference to beverage dispensing includes reconstituting, brewing, steeping, or any other form of combining a dilution ingredient with a brewing substance.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

As shown in FIG. 1, one embodiment of a cold brew system 10 in accordance with the present disclosure includes a beverage container 20 which has an opening or mouth 22 and a cover 24 which can seal the mouth 22. Retained inside the container 20 is a filter device 26 shown diagrammatically. Brewing substance 28 is retained in the filter device 26 for infusion by water delivered over line 30 into the container 20. In the illustrative embodiment, a spray head 32, or other distribution device, is used to distribute water to the beverage brewing substance 28 in the filter device 26. In some embodiments, a distribution device is not used to deliver the water to filter device 26. A gas delivery system 40 is provided and communicates with the container 20 via delivery line 42. The delivery system 40 delivers gas proximate to the filter device 26 to facilitate agitation of the brewing substance 28 in the filter device 26.

Water is delivered over line 30 from a heated water reservoir 50, a chilled water reservoir 52, or an ambient water source 54 as suggested in FIG. 1. The water delivery system referred to collectively by reference number 60 can include the heated water source 50, chilled water source 52, and ambient water source 54. In some embodiments, only one of these sources 50, 52, 54 is used. In some embodiments, only two of these sources 50, 52, 54 are used. The heated water source 50 can be a heated water reservoir which maintains a quantity of heated water for use or an on demand heating system which generally does not retain a volume of water in a heated condition. In the illustrative embodiment, the heated water source 50 includes a reservoir 51 for storing heated liquid and a heater element 53 positioned to heat the liquid in the reservoir 51. The heater element 53 is coupled to a controller 90 over a line D to control the temperature of the water in the reservoir 51. The chilled water source 52 similarly can be in the form of chilled water reservoir which retains a quantity of water in a chilled condition or an on demand chilling system. The ambient water source typically is a plumbed, pressurized source of water which has neither been heated nor chilled. Alternatively, though not shown in detail, each of these sources can be in the form of a reservoir which is manually filled in a "pour-over" manner. Other configurations of these water sources can be provided to produce the desired effect.

A quantity of heated water in combination with chilled water, ambient water, or a combination of both may be used during brewing operations of the cold brew system 10. As such, the water delivery system 60 may distribute heated water from the heated water source 50 with one or both of the other sources 52, 54 to the filter device 26 as suggested in FIG. 1. In the illustrative embodiment, delivery of water to each of these sources 50, 52, 54 can be by pressurized lines 78, 80, 82 in which inlet control valves 72, 74, 76 control the flow of water to the sources 50, 52, 54. The inlet control valves 72, 74, 76 are coupled over lines A, B, C to the controller 90 for selectively opening and closing the valves 72, 74, 76. Each of the water sources 50, 52, 54 can be pressurized with additional air pressurization or water pressurization or as a result of the inlet line pressure. As will be described in greater detail below, the container 20 can be pressurized either directly or by way of the gas delivery system 40. As such, water being delivered to the system must be delivered at a pressure which is greater than the pressurization of the container 20.

During a brewing cycle, brewing substances are placed in the filter device 26 and the filter device 26 is retained within the container 20 with the cover 24 placed over the mouth 22 to seal the container 20 as suggested in FIG. 1. The cover 24 can be sealed to the container 20 in any one of many known designs which might be known to a person of ordinary skill in the art without undue experimentation. A user can operate a user control 100 coupled to the controller 90 over a line 102 to operate the cold brew system 10 and control the brewing cycle. Heated water is dispensed over line 31 from the heated water source 50. The controller 90 operates a control valve 104 through a line 127 to allow a predetermined volume of water to flow from the heated water source 50 to line 30 to dispense the water over the brewing substance 28 retained in the filter device 26 for a predetermined time. This permits a brief heated brewing of the brewing substance 28 to provide an initial "flash" of brewing activity. The flash of brewing activity can be used to promote the "blooming" or pre-infusion of the brewing substance 28. The heated water used in this step of the brewing process can help to initially saturate and break down the surface tension associated with the ground coffee or other brewing substance in filter device 26. Also, it is possible that desired characteristics can be produced from the brewing substance 28 through an initial heated brewing step such as this "flash" brew step.

In the illustrative embodiment, after the initial heated brewing, the controller 90 can control the control valve 104 to permit the introduction of water from the chilled water source 52 and/or the ambient water source 54. The introduction of the water can be provided in a controlled manner by the operation of the control valve 104 to allow or block water from any of the sources 50, 52, 54. Throughout the brewing process, the water can be permitted to flow continuously or by controlled pulses of water which are controlled as to duration and volume as suggested in FIG. 4. In one embodiment of the brewing process, the total desired quantity of additional chilled or ambient water can be dispensed to the filter device 26 for increasing the contact time between the water and brewing substance 28. Alternatively, the additional chilled or ambient water can be dispensed over line 30 to the filter device 26 in a controlled manner to control the amount of contact time that the total quantity of water has with the beverage brewing substance 28.

During the brewing operation, the gas delivery system 40 provides the controlled delivery of a gas over line 42 into the container 20 to deliver the gas to the filter device 26 as suggested in FIG. 1. The gas delivery system 40 includes a gas supply 44 coupled to a control valve 122 by a line 120. The control valve 122 can be controlled over line 124 by controller 90 to regulate the delivery of gas over line 42 from gas supply 44. A pressurization line 128 is coupled between container 20 and control valve 122 to selectively direct gas from gas supply 44 into container 20. Delivery of gas to the filter device 26 is used to create an agitation of the brewing substance 28 retained in the filter device 26. In one illustrative example, agitation increases the turbulence of coffee material within the filter device 26 which tends to improve the interaction of the coffee material with the water. The amount of agitation can be controlled by the gas delivery system 40 such that a continuous flow of gas can be provided throughout the entire brewing process, the gas can be pulsed on and off throughout the process, the gas can be delivered over line 128 to pressurize the chamber generally without agitating the coffee in the filter device 26, or various combinations thereof.

One form of gas which may be used in this brewing process is nitrogen. Nitrogen may be useful since it does not have a negative chemical effect on the production of brewed beverages. In contrast, it is possible that oxygen may produce oxidization of the brewing substance and therefore potentially change the characteristics of the brewing substance. Nitrogen can also be used to at least partially flush out the ambient atmosphere including oxygen from the system such as the carbon dioxide and oxygen which can evolve from the coffee during the initial flash brew process. While in one embodiment the nitrogen might not completely displace the other gases, it will nevertheless create a nitrogen rich and oxygen reduced atmosphere during the brewing process. As such, nitrogen can be delivered to the container 20 in a manner such that it displaces oxygen and other gases within the container 20. In this nitrogen environment the pressure can be elevated to provide a pressurized brewing environment which may help to reduce the overall time required for producing cold brewed coffee. As noted above, the nitrogen can also be used to agitate the coffee providing the dual purpose of pressurizing the system as well as agitating the coffee substance.

Figure 2:
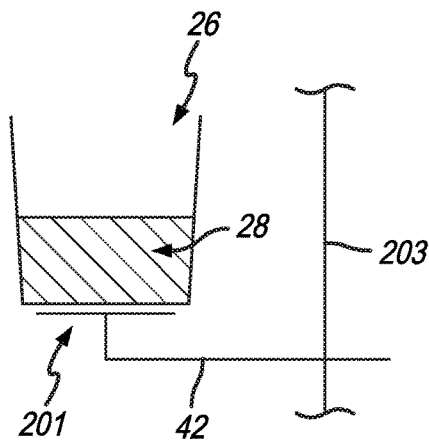
FIG. 2 is a diagrammatic representation of an embodiment which distributes pressurized gas into the brewing substance to facilitate agitation of the brewing substance during the brewing process.
Figure 3:
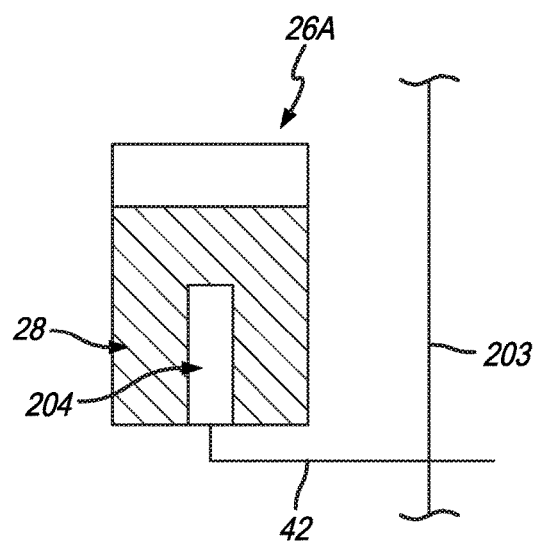
FIG. 3 is an alternate embodiment of a filter device which provides another form of agitation of the brewing process.

Different forms of structures can be developed to provide agitation of the brewing substance 28 in the filter device 26. For example, FIGS. 2 and 3 show two embodiments such that the gas is delivered to the brewing substance 28 in a manner which may enhance the interaction between the gas and the brewing substance 28. As shown in FIG. 2, a diffuser 201 is coupled to the line 42 and is positioned underneath the brewing substance 28 to more broadly distribute the gas through the brewing substance 28 retained in the filter device 26. This structure is shown generally with a wall 203 of the container 20 shown in partial fragmentary view. Similarly, with regard to FIG. 3, a generally cylindrical filter device 26A is provided including a core area 204 coupled to the line 42 for delivery of nitrogen in the core area. The core area 204 results in introducing nitrogen into the beverage brewing substance 28 in the filter device 26A to enhance the passage of nitrogen through the material 28.

Figure 4:
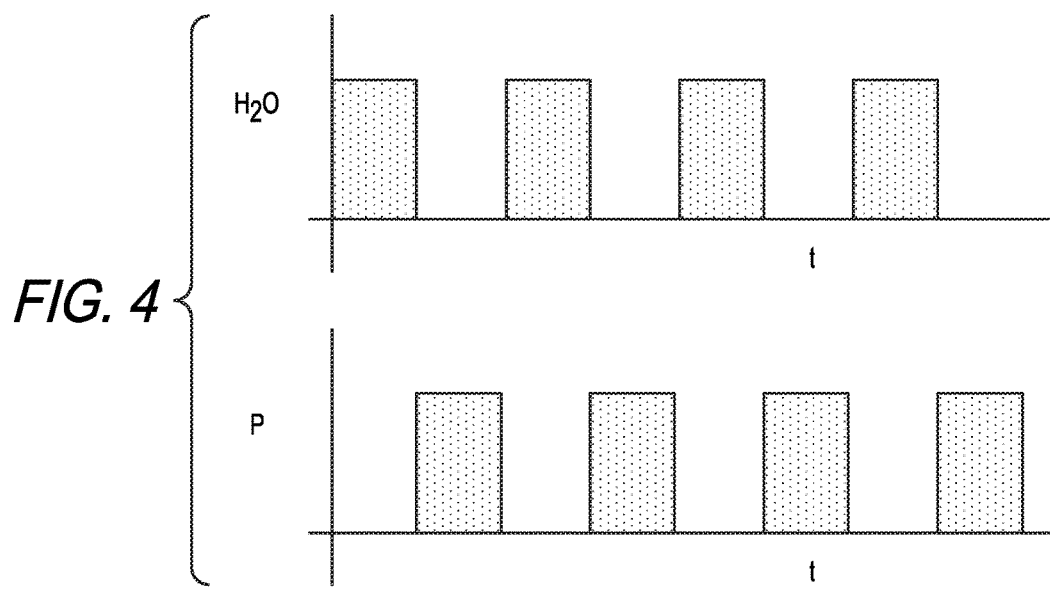
FIG. 4 is a timing chart showing a pulse routine, including a pulsing of water and a pulsing of pressure as one embodiment of a pulse routine for use with the cold brew system of FIGS. 1-3.

With regard to FIG. 4, one embodiment of a pulsing routine is shown. A variety of pulse routines will be recognized by one of ordinary skill in the art without undue experimentation upon learning of this pulsing routine in this disclosure. As shown, there are two timing routines showing the pulsing of water ($H_2O$) and the pulsing of pressure (P). Water is pulsed into the system at intervals to control the dispensing and infusion of water into the brewing substance 28. As noted above, a continuous flow of water may be used to maintain the brewing substance in float throughout the brewing process. Alternatively, if other desired characteristics are found by draining water from the filter device 26, the water can be pulsed off to allow the quantity of water to drain through the filter device 26 and form part of the final brewed beverage. The pulsing can occur as a result of agitating the brewing substance over line 42 or by pressurizing the container over line 128. A pressure detector 130 is provided in the container 20 and is coupled to the controller 90 over line 132. It is possible that this pulse pressuring can produce additional improvement and interaction between the water and the brewing substance particles. As noted above, the pulsing of the gas can be used in combination with the pulsing of water as well as each one being provided in its own cycle independent of the other.

The controller 90 can monitor the pressure within the container 20 and by control of a vent valve 136 coupled to the controller 90 over line 138 regulate the pressure within the container 20 as suggested in FIG. 1. This control system can allow the pressure to be elevated or decreased in a controlled manner. Alternatively, a pressure relief valve may be provided which reduces the pressure in the container 20 or opens and closes within a predetermined range of pressures. For example, if the pressure rises above a lower level the valve may not open until it reaches a higher level. At the higher level the valve is allowed to open until the pressure in the container 20 drops to the lower level, at which point the valve may close.

With regard to pressurization, a pressurization system can be provided in the heated water source 50 such that a pressurizing device 200 can be coupled to the heated water source 50 and controlled over line 202 by the controller 90 as suggested in FIG. 1. The pressure source 200 can pressurize the heated water in the reservoir 51. Pressurization of the heated water can help reduce the associated brew time with the flash portion of the brewing. In other words, the combination of the elevated temperature of the water can have a positive effect accelerating the brewing process and reducing the time required for the flash brewing process. The increased pressure in the brewing process forces the heat into the brewing substance particles to further accelerate this process.

The resultant beverage brewed from brewing substance 28 flows through filter device 26 and is collected in container 20 as suggested in FIG. 1. The container 20 may include heating or cooling elements to regulate the temperature of the brewed beverage within the container 20. Alternatively, bypass water from any of the sources 50, 52, 54 may be selectively directed through a line 33 into the container 20 by control valve 104 to increase or decrease the temperature of the brewed beverage, or to dilute a concentration of the brewed beverage to an optimal drinking concentration. The brewed beverage can be dispensed through a controllable nozzle 27 attached to the container 20 at the selection of a user.

In use, the cold brew system 10 for cold brewing beverages from brewing substances, such as coffee, can help to improve and control the characteristics of the produced beverage as well as accelerate the brewing process to reduce overall brewing time. The use of a flash brewing step in the brewing process of one embodiment of the disclosed brewing system might help to accelerate the initial extraction of desired characteristics and substances from the brewing substance 28 retained in the filter device 26. Subsequent combination and quenching of the brewing substance 28 either by directly dispensing over the substance or by adding to the container 20 in which the substance is steeped and saturated can enhance the overall brewing process. As noted, the system may be pressurized to improve the wicking of water into the grains and cellular structure of the particles of the brewing substance 28. The use of a gas such as nitrogen to agitate the brewing substance 28 within the filter device 26 can improve the overall agitation and contact therewith.

The cold brew system 10 maximizes the automation of the overall brew process. Use of the controller 90 to control the processes may enhance the reliability, predictability, and repeatability of the process to achieve a desired finished product profile in a predictable manner. A number of recipe or brewing process characteristics can be programmed or otherwise retained on the controller 90 to control the overall process. For example, the volume of hot water used in the initial flash brewing step can be programmed and dispensed either in a continuous flow or in a pulsed flow of predetermined pulse times. The addition of cold or ambient water can be controlled by the controller 90 and dispensed over the brewing substance 28 or added in a manner surrounding the brewing substance 28. The cold water if added over the top of the brewing substance 28 can be introduced in a pulsed sequence using pulses of predetermined length. The pulses may all be the same length of time or may be of varying lengths of time depending on the results desired or produced by different pulsing routines. It may be found that different pulse routines can produce different expressions of flavor characteristics and other characteristics associated with the brewing substance 28 to produce a desired finished product profile. The overall steeping or hold time for the process can be programmed such that at the end of the overall brew time the system can provide an alarm such as an audio or visual signal to the operator. Additionally, the gas agitation times can be programmed so that the agitation can occur continuously throughout the process or at different intervals as determined by the programmable routines associated with a predetermined recipe.

In one exemplary recipe, the water to coffee ratio can be approximately 11:1 such that 11 volumes of water are used to each volume of coffee. Additionally a pre infusion or flash brewing volume could be used equal to two times the volume of coffee used in the process. In other words, a single volume of coffee may be introduced into the filter device 26. Two times that volume of water may be introduced into the filter device 26 to thoroughly saturate and provide an initial "bloom" during the flash brewing phase of the process. The process can be pressurized to increase the infiltration of water into the coffee particles. Additionally, the heated water can be provided at an elevated pressure so that the heated water may actually be at a higher temperature to enhance the initial blooming. Nitrogen can be used to agitate the coffee as well as to provide displacement of oxygen and other ambient atmosphere in the container 20 in a controlled manner. At the end of the brewing cycle if the container 20 is to be used as a dispenser, nitrogen can provide a propellant to allow for dispensing of the cold brewed coffee from the controllable nozzle 27 or other dispensing system.

Figure 5:
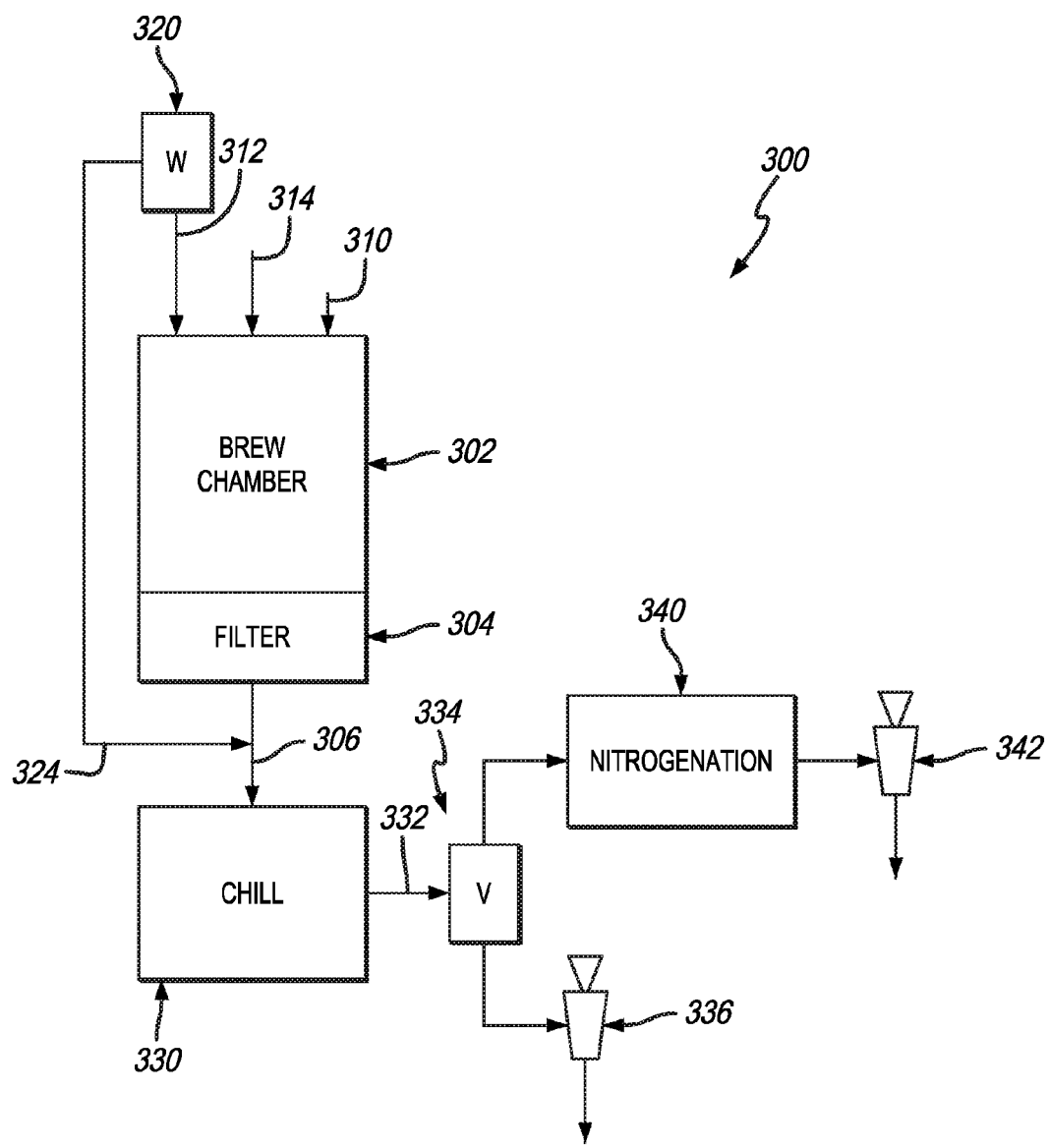
FIG. 5 is a general diagrammatic view of another embodiment of a cold brew system which uses a pressurized brew chamber with a filter component to produce brewed beverage which can then be advanced to a chilling component after which it can be directed to a controllable valve for dispensing in a ready to drink condition or directed to a nitrogen in-line infuser to infuse the mixture with nitrogen for subsequent controlled dispensing.

With reference to FIG. 5, one embodiment of a pressurized brewing system 300 in accordance with the present disclosure is shown. The system includes a brew chamber 302 which includes a filter component 304. A variety of pressurized brewing chambers 302 can be used for this embodiment to produce a brewed beverage 306 from the system. This system 300 is different from that as shown in FIGS. 1-3 such that it does not use a "full-immersion" basket-type brewing system. The system 300 shown in FIG. 5 combines a beverage brewing substance with water, and then separates brewed beverage from the brewing substance through a filter.

As shown generally diagrammatically and without specific detail in FIG. 5, water 312 is delivered to the brew chamber 302 along with coffee 310 or other beverage brewing substance. Coffee 310 is delivered to the brew chamber 302 after which it can be sealed. Water 310 can be dispensed either prior to sealing or after sealing of the brew chamber 302. Pressurization 314 can be controlled through a variety of techniques. These techniques might include, but are not limited to, pressurization using air pressurization of the cavity in the chamber, physical pressurization such as by use of a piston movable within the chamber, or displacement pressurization which displaces another component in the brew chamber such as by hydraulic or pneumatic pressure but not by a driven piston as previously described.

The filter component 304 can be a single or multiple layer filter which is sized and dimensioned to provide a variable or predetermined control. The filter component 304 can be either a fixed form of filter, a selectable form of filter, or a displaceable filter such as might be carried on a pressurizing piston within the chamber 302. This allows for additional controls in the brewing system.

This type of brewing system 300 provides numerous controls but has some limitations. For example, while it can be recommended to the user, it could be difficult for the system to control the grind of the brewing substance used, the type of substance, coffee or otherwise, if coffee is used—the type of coffee such as the origin, processing techniques, decaf, or regular, or level of roast. Additionally, it could be difficult for the system to control the dose of coffee used by the user. It is possible that sensors could be adapted to the brew chamber 302 to detect the grind such as by optical or other sensing techniques currently known or hereafter developed. Additionally, the type of substance used such as coffee or otherwise could be detected by currently known sensors or sensors hereafter developed. This would be yet another way to provide a control on the system to help achieve the desired end result beverage 306.

Similarly, the dose could be controlled by the volume of the chamber 302 such that the chamber 302 is sized and dimensioned to control for the ultimate full capacity dose used in the chamber 302. While this would provide for an upper end dose volume other embodiments could also be used to control or monitor the dose used in the chamber 302. For example, a level sensor such as an optical or other type of sensor, currently known or hereafter developed, could be used to detect the level of material in the chamber 302. Similarly, a weight sensing system could be used to detect the weight of the dose within the chamber 302 using a tare of the chamber 302 prior to addition of the dose in the chamber 302. Additionally, the dose could be monitored, to some degree, by detecting the level of compaction by the pressurizing system 314 on the chamber 302. If any of the parameters such as grind, substance, or dose fall outside of predefined parameter or range of parameters the system 300 could provide a lockout of the brewing cycle and alert the user to the undesirable condition.

There are additional controls that can be provided on the system 300 as suggested in FIG. 5. For example, the temperature of the water 312 from a water delivery system 320 can be monitored. Also, since it is monitored it can be controlled, the water delivery system 320 can provide one or a combination of temperature conditions. For example, the entire system can operate at unheated, ambient or chilled temperatures as well as heated temperatures. Alternatively, a combination of temperatures could be used depending on the type of brew result desired.

In one exemplary situation, a quantity of heated water, for example, in the range of about 95 degrees F. to about 205 degrees F., could be used to initiate the brewing cycle to "pre-infuse" the coffee substance. This might be used to initiate the brewing chemistry that occurs when heated water comes in contact with the brewing substance to initiate the release of gases, flavor components, volatiles, and other characteristics. Subsequently, a reduced ambient temperature or cooled/chilled water infusion could be used such as water in the range of about 60 degrees F. It should be noted these temperatures are provided as examples of one embodiment of the operation of this type of system. Based on the teachings herein, one of ordinary skill in the art will be able to develop additional systems based on the teachings herein which were unavailable prior to this disclosure.

Further, this type of system may allow for a pre-infusion volume control. In this regard, the volume of water used during a pre-infusion cycle (regardless of the temperature of the water) could be controlled. It should be noted that all of the various controls herein can either be pre-set as a standard to be used across the board for all types of brewing substances as well as being controllable based on selected parameters and/or ranges of parameters which might achieve a desired result in a "recipe" as configured for the type of brewing substance used. This would provide a great degree of controllability to produce a variety of beverage results.

Further, a pre-infusion dwell time could be programmed in the system. This would allow the coffee to steep for a period of time after being pre-infused with a controllable volume of pre-infusion water at a predetermined temperature. This dwell time is yet another variable that can be controlled by the system to help enhance the overall consistency, reliability, and reproducibility of the end result and provide recipe control.

It should be noted that the additional brew water that is used after the pre-infusion water can also be controlled. The volume, temperature, dispense rate, pulsing, as well as dwell time can all be controlled. This relates to the overall extraction time in how long the water may remain in contact with the brewing substance during the brewing process and after which time the coffee may be driven out of the brew chamber 302.

An additional benefit of such a controllable brew chamber is that agitation may also be incorporated in the brewing process. In this regard, the type of agitation as well as the activity/strength of the agitation as well as the dwell time of the agitation period or multiple agitation cycles can be controlled. The type of agitation might be in the form of mechanical, sonic, infusion with a gaseous substance, or otherwise, using currently know or hereafter developed agitation techniques. Nevertheless, the system allows for the programmability of the agitation to provide a continuous agitation, pulse agitation, or other various timings of agitation to produce a desired result. For example, while some coffee may benefit from active, enhanced agitation with a gaseous substance such as nitrogen, other substances might not benefit from such agitation. Agitation and dwell time can increase the length of the brew cycle which may, or may not, be desirable depending on the brewing conditions and the expectations of customers. As such, if agitation is not needed or only a brief agitation is needed, the system can be programmed to produce such agitation to achieve the desired end results.

As noted above with regard to the alternate embodiment, nitrogen could be used to infuse the slurry of brewing substance and water within the chamber 302. Nitrogen may be beneficial due to its relatively inert properties such that it does not produce or exacerbate the oxidization of the substances within the brewing substance or brewed beverage. Nitrogen may also be selected as it imparts little or no added "taste" to the finished beverage. As such, it might be possible to achieve and control desirable flavor characteristics in the brewing substance as a result of the use of at least some degree of controlled nitrogen agitation. Once again, the agitation can range from relatively active to relatively passive. Active agitation might include higher pressures, smaller bubble sizes, faster flow rates of the gas, as well as other characteristics. A more passive agitation might be in the form of larger bubble size at lower pressures merely allowing the nitrogen to pass through the slurry to provide some relatively minimal degree of agitation.

The pressure 314 used to "press out" the liquid from the brewing substance in the chamber 302 could be controllable as well as suggested in FIG. 5. This controllable system may provide for a range of press out from a relatively rapid press out to relatively slow press out. This might be desirable to control, similar to as noted above, to expedite the brewing process or to help optimize the brewing process. This type of system might be used to further enhance the flavor characteristics by rapidly pressing out the liquid from the brewing substance to help control or limit the contact time between the water and brewing substance. Alternatively, if it is important to a particular brewing substance or recipe to allow the brewing substance to remain in engagement with the water for a longer period of time, the press out could be extended, pulsed, or otherwise controlled to promote the dispensing of the brewed beverage 306 but allow for the longer contact time to optimize the flavor characteristics.

Additionally, it is possible to produce a volume of brewed beverage 306 in the form of a concentrate as suggested in FIG. 5. This would allow the system to provide a volume of bypass water 324 from the water dispensing system 320 to combine with the brewed beverage 306. This may allow desirable characteristics to be developed in the concentrate while allowing for dilution of those characteristics to a desired range of controls by use of bypass water 324. As noted with regard to other controls, the volume, dispense rate, temperature, as well as other characteristics of the bypass water 324 can be controlled prior to its combination with the concentrate.

Once the brewing process starts, FIG. 5 shows that a chilling unit 330 can be provided to receive the brewed beverage 306 or brewed concentrate combined with bypass water 324 to provide a chilled output beverage product 332. In some embodiments, ice is added to the brew chamber 302 as part of the brew cycle to chill the brewed beverage being formed. It should be noted that the system is generally closed in an air tight condition to prevent and/or minimize or at least to some degree control oxidization. In other words, once the brewing substance, such as freshly ground coffee, is dispensed into the brew chamber 302, the chamber 302 is sealed and air, primarily oxygen, cannot cause interaction and detrimental flavor characteristics during the brewing process. The chilling of the brewed beverage can also further decrease the oxidization process and provide a preferred flavor profile associated with a particular predetermined output beverage 332.

The output beverage 332 can be directed through a controllable valve 334 and directly dispensed through a controllable nozzle 336 at the selection of a user as suggested in FIG. 5. The benefit of a controllable valve 334 is that the chilled beverage 332 can be directed to the controllable nozzle 336 for controlled dispensing as a ready to drink chilled beverage. Alternatively, the beverage 332 can be directed to a nitrogen infusing device 340. After being infused with nitrogen, the nitrogen enhanced beverage can be dispensed from a separate controllable nozzle 342.

The filters used with this system can be mesh, metal or other reusable material mesh, disposable paper, non-woven paper or non-paper fibers, cloth or other filter materials. It may be desirable to configure the system to use disposable filters such as a standard sized paper filter to provide ease of availability.

Figure 6:
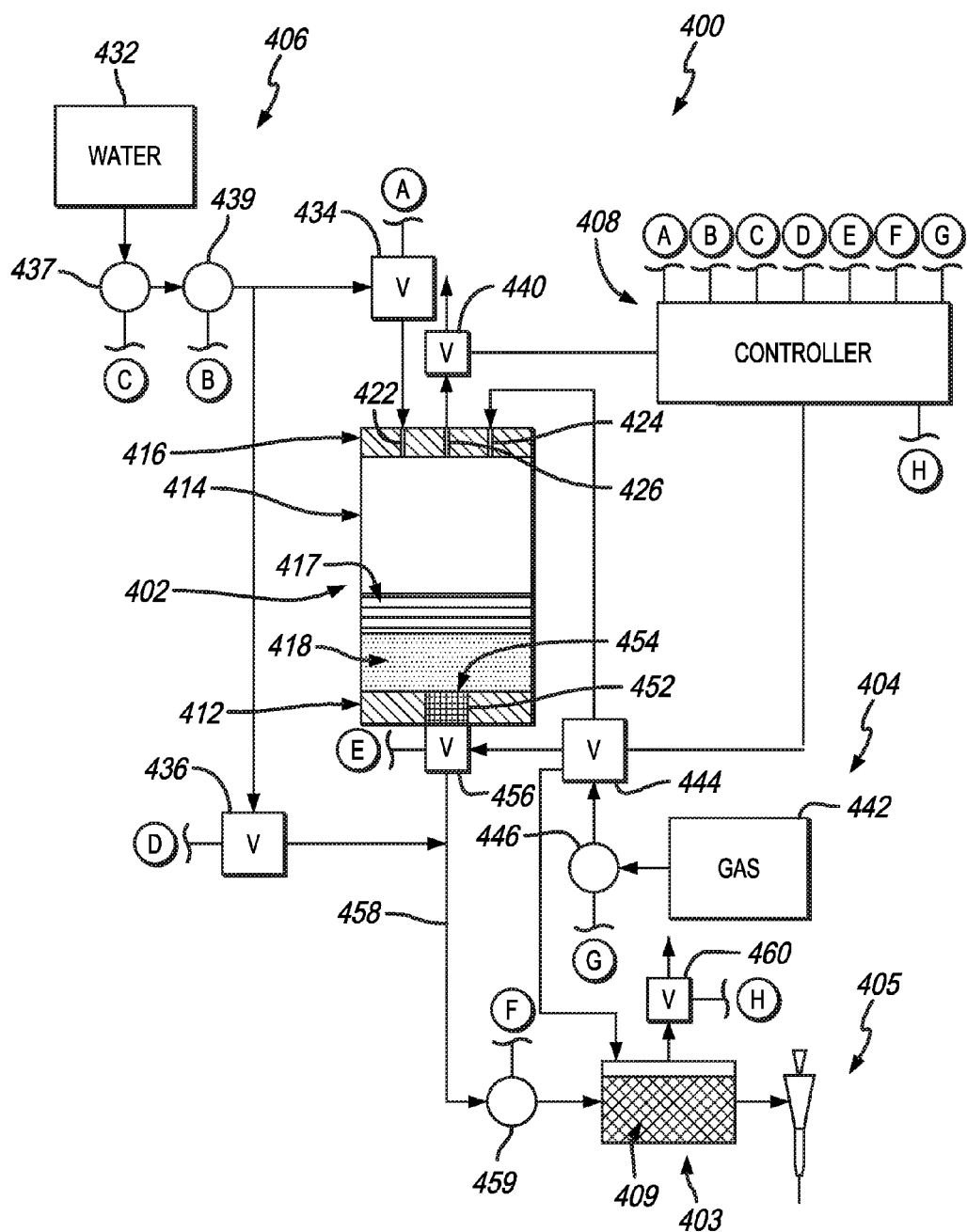
FIG. 6 is a general diagrammatic view of another embodiment of a cold brew system which uses a nitrogen-pressurized brew chamber with a filter component to produce brewed beverage which can direct pressurized nitrogen gas through the filter component and a beverage brewing substance in the brew chamber for agitation of the beverage brewing substance and which can dispense the brewed beverage using pressure within the brew chamber.

Another embodiment of a cold brew system 400 is shown diagrammatically in FIG. 6. The cold brew system 400 illustratively includes a brew chamber 402, a gas delivery system 404, and a water delivery system 406. A controller 408 is used to control the brew process of the cold brew system 400. In the illustrative embodiment, a resultant brewed beverage 409 is collected in a dispenser tank 403 to be dispensed through a controllable nozzle 405 at the selection of a user.

The brew chamber 402 illustratively includes a base 412, a sidewall 414, and a lid 416 as shown in FIG. 6. In the illustrative embodiment, the lid 416 is removable to allow a user to place a brewing substance 418, such as ground coffee, within the brew chamber 402 and to seal the brew chamber 402 when the lid 416 is mounted to the sidewall 414. In some embodiments, the brewing substance 418 is introduced through a port in the brew chamber 402 such that the lid 416 may remain mounted. The brewing substance 418 should be ground coarse enough to prevent clogging of the filter element 454 and fine enough to allow sufficient extraction during the brewing process. In practice, the grind size may be selected and controlled to achieve the desired extraction, and work with the filter element 454, but may be within the range generated by industry available grinding devices.

The water delivery system 406 illustratively includes a water supply 432 and a pair of control valves 434, 436 as shown in FIG. 6. The water supply 432 can be configured to deliver water at a variety of temperatures. In some embodiments, the water supply 432 is similar to water delivery system 60 of FIG. 1. In the illustrative embodiment, the water supply 432 is a tank or vessel for storing water which can be temperature controlled as suggested in FIG. 6. A pump 437 pulls water from the water supply 432 and pushes it toward control valves 434, 436. A flow meter 439 measures the amount of water flowing form water supply 432 to control the amount of water being delivered through control valves 434, 436. In some embodiments, a single control valve replaces the control valves 434, 436.

The gas delivery system 404 illustratively includes a gas supply 442 and a control valve 444 as shown in FIG. 6. The gas supply 442 is configured to supply pressurized gas, such as nitrogen for example, to control valve 444. A regulator 446 may be used to regulate the pressure of the gas being supplied to the control valve 444 by the gas supply 442.

The lid 416 of the brew chamber 402 illustratively includes a water inlet port 422, a gas inlet port 424, and a vent port 426 as shown in FIG. 6. The control valve 434 of the water delivery system 406 is coupled to water inlet port 422 to selectively deliver water 417 from the water supply 432 to the brewing substance 418 in the brew chamber 402. In some embodiments, a sprayhead is positioned in the brew chamber 402 and coupled to the water inlet port 422 to distribute the water 417 across the brew chamber 402. The control valve 444 of the gas delivery system 404 is coupled to gas inlet port 424 to selectively deliver pressurized gas from the gas supply 442 to the brew chamber 402. A vent valve 440 is coupled to the vent port 426 to selectively release gas or other sources of pressure from the brew chamber 402.

The base 412 of the brew chamber 402 illustratively includes an outlet port 452 and a screen or filter element 454 coupled to the outlet port 452 as shown in FIG. 6. The filter element 454 is configured to block the brewing substance 418 from discharging through the outlet port 452 while allowing liquid, such as a beverage brewed from the brewing substance 418, to discharge through outlet port 452. A control valve 456 (sometimes called an exit valve) is coupled to the outlet port 452 to selectively block or allow flow through the outlet port 452. Control valve 444 of gas delivery system 404 is coupled to control valve 456 to selectively deliver gas from gas supply 442 to control valve 456.

In the illustrative embodiment, control valve 456 is configured to operate in at least three configurations as suggested in FIG. 6. In a first configuration, control valve 456 blocks all flow through outlet port 452 of brew chamber 402. In a second configuration, control valve 456 directs the gas from gas supply 442 into the brew chamber 402 through outlet port 452. The pressure of the gas is sufficient to prevent liquid in brew chamber 402 from passing out of outlet port 452. In a third configuration, control valve 456 allows liquid in the brew chamber 402 to flow through outlet port 452 toward an outlet line 458. In some embodiments, a pressure sensor is coupled to the brew chamber 402 to measure pressure therein and allow the controller 408 to control the pressure within the brew chamber 402.

Control valve 436 (sometimes called a mixing valve) is also coupled to outlet line 458 to selectively supply water (sometimes called bypass water) from the water supply 432 to outlet line 458 as suggested in FIG. 6. Outlet line 458 is coupled to dispenser tank 403 to direct the brewed beverage 409 into dispenser tank 403. In the illustrative embodiment, a sensor 459, such as a total dissolved solids sensor, measures characteristics of the liquid flowing through outlet line 458 so that the controller 408 can control the amount of bypass water supplied through mixing valve 436 to control the concentration of the resulting brewed beverage 409.

In the illustrative embodiment, a tank vent valve 460 is coupled to dispenser tank 403 to selectively release gas or other sources of pressure from the dispenser tank 403 as suggested in FIG. 6. Additionally, gas, such as nitrogen, from gas supply 442 may be directed through control valve 444 to pressurize dispenser tank 403. The pressurizing gas may aid dispensing of the brewed beverage 409 through controllable nozzle 405 and provide nitrogenation of the brewed beverage 409. In some embodiments, the controllable nozzle 405 is a "stout beer" style nozzle having an elongated outlet neck with an integrated small orifice. This style of nozzle may aid in creating a cascade of gas within the brewed beverage dispensed through the controllable nozzle 405 and maximize mouth feel of the dispensed brewed beverage.

Figure 7:
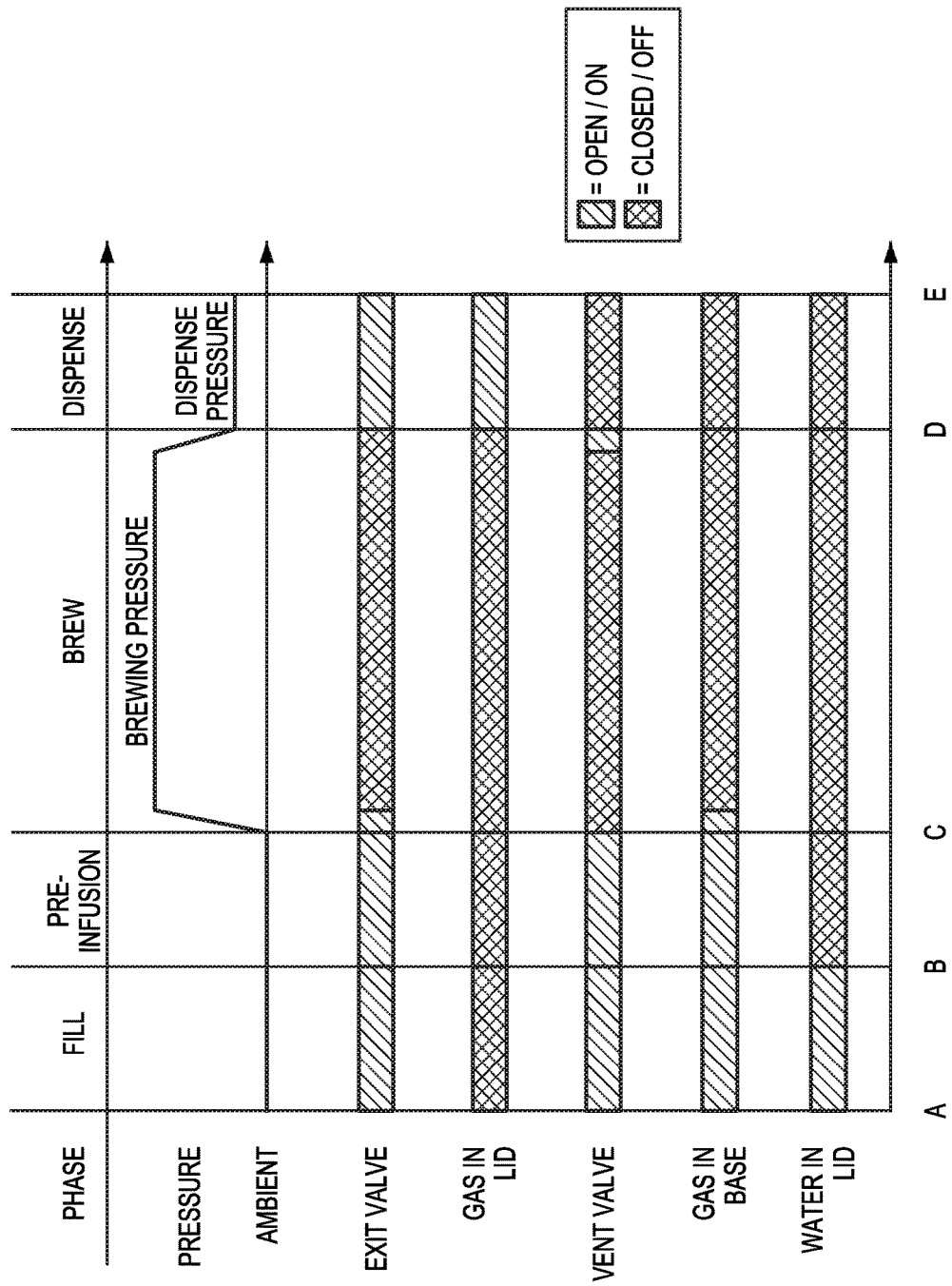
FIG. 7 illustrates one embodiment of a process timeline for use with the cold brew system of FIG. 6, including operation of various components of the cold brew system to regulate pressure within the brew chamber.

One embodiment of a process timeline for operating cold brew system 400 is shown in FIG. 7. The illustrative process starts at point A after the brewing substance 418 has been added to the brew chamber 402. The controller 408 then automates the process, which may include specific input parameters from a user of cold brew system 400. In some embodiments, the entire process is automated, including the addition of brewing substance 418 into brew chamber 402, with limited input by a user of cold brew system 400. For example, the user may add brewing substance, whole or ground, to a hopper for supplying the brew chamber 402 and select a predetermined program of the cold brew system 400 through a user interface. In some embodiments, ice is added to the brew chamber 402 as part of the brew cycle to chill the brewed beverage being formed.

A "fill" phase of the process occurs between point A and point B in the timeline as suggested in FIG. 7. In this fill phase, water 417 from water supply 432 is supplied through water inlet port 422 of lid 416 and into brew chamber 402. The exit valve 456 is in the second configuration to allow gas from gas supply 442 to enter the brew chamber 402 through outlet port 452 while the vent valve 440 is also open to maintain the brew chamber 402 at an ambient pressure. The gas entering the base 412 causes agitation of the brewing substance 418 to maximize interaction with the water 417 and minimize the time needed to form the brewed beverage. This agitation also begins to form a slurry between the water 417 and brewing substance 418.

A "pre-infusion" phase (sometimes called a turbulence or bloom phase) of the process occurs between point B and point C in the timeline as suggested in FIG. 7. In this pre-infusion phase, control valve 434 is closed to stop the flow of water through water inlet port 422. The exit valve 456 is maintained in the second configuration to allow gas from gas supply 442 to enter the brew chamber 402 through outlet port 452 and the vent valve 440 is also maintained in an open state to maintain the brew chamber 402 at an ambient pressure. The gas entering the base 412 continues to agitate brewing substance 418.

A "brew" phase of the process occurs between point C and point D in the timeline as suggested in FIG. 7. At the start of this brew phase, the exit valve 456 is maintained in the second configuration to allow gas from gas supply 442 to enter the brew chamber 402 through outlet port 452 and the vent valve 440 is closed to increase pressure within the brew chamber 402 to a brewing pressure and provide additional agitation to the brewing substance 418. This additional agitation may be more agitating than when the vent valve 440 was open. Once the brewing pressure is reached, the exit valve 456 is closed to seal the brew chamber 402 and stop the flow of gas through outlet port 452.

In the illustrative embodiment, the brewing pressure is maintained substantially constant during a majority of the brew phase as suggested in FIG. 7. In some embodiments, the brewing pressure varies throughout the brew phase. For example, outgassing from the brewing substance 418 may increase pressure in the brew chamber 402 during the brew phase. This increase in pressure may be relieved by vent valve 440 to maintain the brew chamber 402 at a substantially constant pressure. In some embodiments, the vent valve 440 may be used to decrease the pressure of the brew chamber 402 over time during the brew phase. The pressure maintained during the brew phase minimizes the overall brew time to form the brewed beverage, such as a few minutes instead of 12-24 hours for example. The pressure may drive both the water and gas into the cellular structure of the brewing substance. Then, when they are separated, the brewed beverage carries with it the desired solids and flavors from the brewing substance.

In the illustrative embodiment, the vent valve 440 is opened at the end of the brew phase to decrease the pressure in the brew chamber to a dispense pressure as suggested in FIG. 7. This decrease in pressure can cause a cracking or other breakdown of the cell structure in the brewing substance 418 due to the outgassing of the gas supplied by the gas supply 442 from the brewing substance 418. This is especially true of nitrogen which can cause cavitation during rapid decompression. This breakdown can increase the realized extraction from the brewing substance 418 in forming the brewed beverage.

A "dispense" phase of the process occurs between point D and point E in the timeline as suggested in FIG. 7. The exit valve 456 is placed in the third configuration to allow the brewed beverage to flow through outlet port 452 and into outlet line 458. During this operation, the brewed beverage is separated from the brew material 418 by the filter element 454. Gas from gas supply 442 may be introduced through gas inlet port 424 to maintain the pressure within the brew chamber 402 at the dispense pressure as the liquid exits the brew chamber 402. Maintaining the dispense pressure during the dispense phase may maximize the positive characteristics realized through the extraction from the brewing substance 418 and add to the mouth feel of the dispensed brewed beverage. In some embodiments, the dispense pressure decreases throughout the dispense phase as the liquid is pushed out of the brew chamber 402.

After point E the brewed beverage may be mixed with bypass water and collected in dispenser tank 403 to be dispensed at the selection of a user. The used brewing substance is removed from the brew chamber 402 to allow the process to restart for brewing a subsequent volume of brewed beverage. As noted above, the controller 408 can automate most if not all of the process by controlling the various components of the cold brew system 400. The phases shown in FIG. 7 are illustrative and can be shortened or lengthened relative to one another as desired. The time between point C and point D may be a recipe control parameter to impact the strength and extraction of the finished brewed beverage. In general, the strength and extraction increases with time. The time between point D and point E may similarly be used as a recipe adjustment parameter. This time to push the liquid through the solid brewing substance and out through the filter element may modify the resulting extraction and strength levels as well. Faster or slower pushout can modulate the extraction and strength levels, with both generally increasing with longer time.

Generally, the brewing process from point A to point E takes from about 2 minutes to about 4 minutes to complete. Generally, the brewing pressure is about 30 PSI to about 300 PSI. Generally, the dispensing pressure is about 20 PSI to about 75 PSI. Generally, the temperature of the water supplied to the brew chamber 402 is less than 80 degrees F., and usually about 40 degrees F. However, other times, pressures, and temperatures are possible without departing from the teachings of the present disclosure. For example, forming larger batches of approximately one gallon or more of brewed beverage in a single A to E cycle may require more time and different pressures than a "single serving" sized batch. The process may still be on the on the order of minutes rather than hours for these larger batches.

In one illustrative recipe, the water to coffee ratio is about 5:1 such that 5 volumes of water are used to each volume of coffee by weight. For example, if about 3 ounces of coffee are added to the brew chamber 402, then about 15 ounces of water are used during the brewing process, and yields about 12 ounces of brewed beverage. The water 417 is dispensed into the brew chamber 402 at about 40 degrees F. Point A to point B in the timeline of FIG. 7 is about 10 seconds to about 15 seconds. Point B to point C is about 10 seconds to about 15 seconds. Point C to point D is about 2 minutes to about 3 minutes. Point D to point E is about 10 seconds to about 15 seconds. The brewing pressure is about 90 PSI to about 110 PSI. The dispense pressure is about 40 PSI to about 60 PSI. This is merely one exemplary recipe which can be modified as desired to vary the characteristics of the resulting brewed beverage.

In illustrative embodiments, ground coffee is added to the brewing chamber 402 which is then sealed. Water 417 is introduced into the brew chamber 402, which is vented by the vent valve 440, and a steady but low flow rate of nitrogen is added to the chamber 402 through the base 412. When the desired amount of water 417 is added, the pump 437 is stopped and the valve 434 is closed. The chamber 402 is then pressurized to a predetermined target level with the vent valve 440 closed. The pressure is maintained for a predetermined time to form brewed beverage from the coffee. The chamber 402 is then vented through vent valve 440 to a predetermined dispense pressure (sometimes called a push out pressure). The exit valve 456 is then opened to dispense the brewed beverage from the chamber 402.

In illustrative embodiments, the push out pressure may affect the level of nitrogenation of the brewed beverage, the level of "crema" of the brewed beverage, and the strength or concentration of the brewed beverage, among other characteristics. The pressure within the brew chamber 402 during the brew phase may affect the strength or concentration of the brewed beverage, among other characteristics. Using colder water during the brewing process may increase the ability of the gas, specifically nitrogen, to form a solution with the brewed beverage. Extending the process may increase the level of extraction from the brewing substance 418 and form a more concentrated brewed beverage. The mixing valve 436 may be used to dilute the liquid exiting the brew chamber 402 to form a ready-to-drink beverage, and may be controlled based on measurements from the sensor 459. In some embodiments, a concentrated coffee beverage is formed using the cold brew system 400 which has a coffee strength concentration of around 3.0 total dissolved solids. In some embodiments, a ready-to-drink coffee beverage, with no dilution, is formed using the cold brew system 400 which has a coffee strength concentration of around 1.5-1.7 total dissolved solids.

In illustrative embodiments, a nitrogen infuser is coupled to the outlet line 458 to further nitrogenate the brewed beverage. A secondary filter element may filter the brewed beverage after exiting the brew chamber 402. Various shapes and sizes of filter element 454, as well as materials used to form the filter element 454, may affect the characteristics of the brewed beverage. In some embodiments, the brew chamber 402 has an inner diameter of 3 inches and a height of 6 inches with an internal volume of 42.41 cubic inches. In some embodiments, the liquid lines have an internal diameter of 0.125 inches. In some embodiments, the filter element 454 is disk shaped having a diameter of about 1-2 inches.

Figure 10:
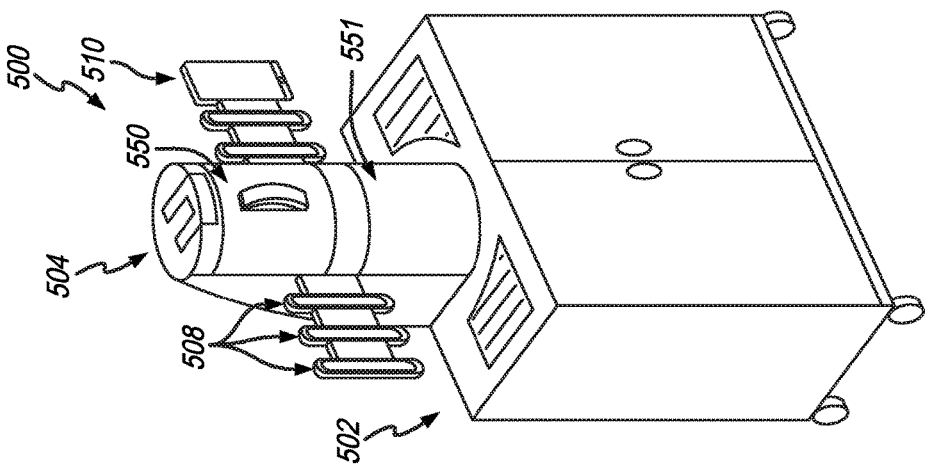
FIGS. 8, 9, and 10 illustrate one embodiment of a beverage-delivery system for dispensing a brewed beverage.
Figure 9:
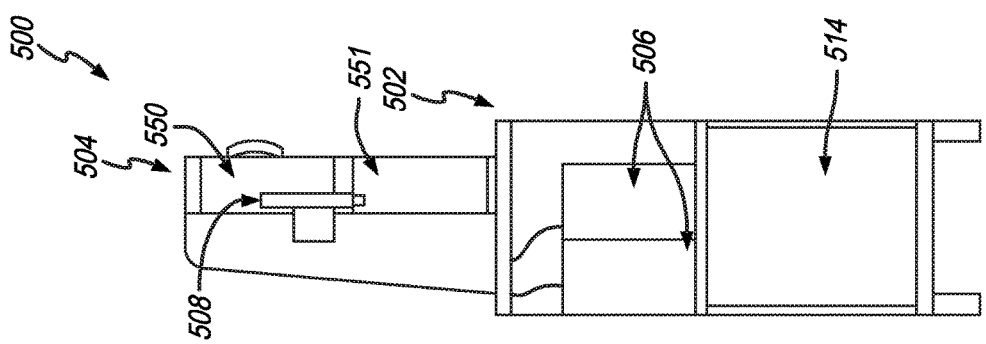
Figure 8:
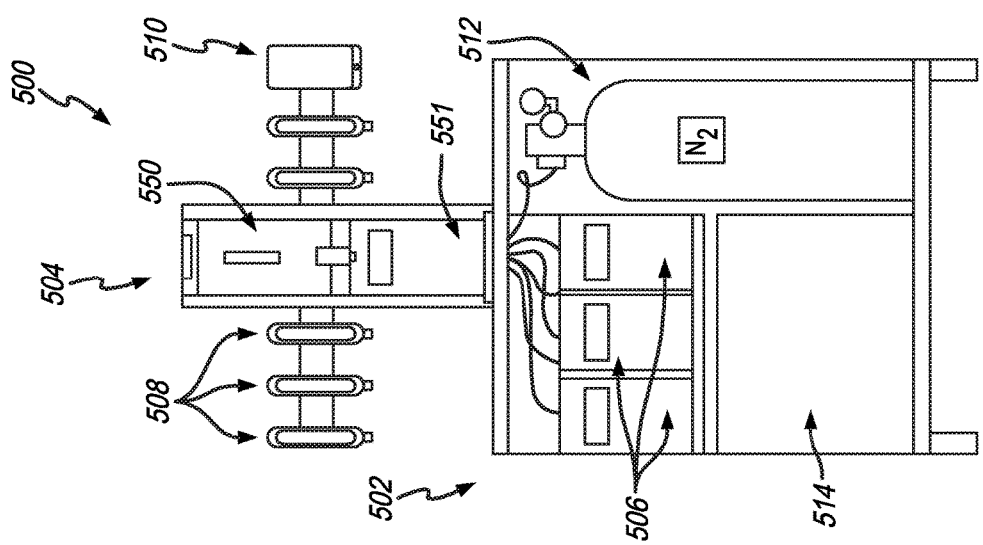

One embodiment of a beverage-delivery system 500 is shown in FIG. 8. The beverage-delivery system 500 includes a base 502 and a tower 504 coupled to the base 502. The base 502 is accessible by a user through a front panel as suggested in FIG. 10. A gas supply 512, which illustratively contains nitrogen gas, and a water supply 514 are positioned in the base 502 for use in brewing and dispensing a brewed beverage formed in the beverage-delivery system 500. In some embodiments, the water supply 514 is chilled or contains ice supplied by a user. A brew chamber 550 of the tower 504 is configured to create a brewed beverage in accordance with the methods described above to be dispensed into a holding tank 551 as suggested in FIG. 8. A user adds a brewing substance to brew chamber 550 and then engages a user interface 510 to begin a brew cycle. In the illustrative embodiment, the brew cycle is automated after entry of brewing parameters by the user through the user interface 510. Once the brew cycle is completed, the holding tank 551 can be removed and stored in the base 502 in an array of holding tanks 506 for later dispensing of the brewed beverage through the dispensers 508. In the illustrative embodiment, a single holding tank 506 is connected to a single dispenser 508 as suggested in FIGS. 8 and 9. In some embodiments, a brewed beverage is formed at ready-to-drink strength. In some embodiments, the brewed beverage is formed as a concentrate to be combined with additional water from water supply 514 during dispensing. The user interface 510 also allows a user to dispense brewed beverage from the holding tanks 506 through the dispensers 508. In some embodiments, gas supply 512 pressurizes holding tanks 506 to dispense the brewed beverage. In some embodiments, base 502 is chilled or refrigerated to maintain the temperature of the brewed beverage in the holding tanks 506. In the illustrative embodiment, beverage-delivery system 500 is used to brew batches of brewed beverage for later dispensing as individual servings.

Another embodiment of a beverage-delivery system 600 is shown in FIG. 11. The beverage-delivery system 600 includes a base 602 and a tower 604 coupled to the base 602. The base 602 is accessible by a user through a front panel as suggested in FIG. 13. A rack 608 is coupled to the tower 604 to hold one or more brew chambers 606 as suggested in FIGS. 11 and 12. The brew chambers 606 are fluidly coupled to a gas supply 612, illustratively containing nitrogen, and a water supply 614 through the rack 608 as suggested in FIG. 11. In some embodiments, the water supply 614 is chilled or contains ice supplied by a user. A user interface 610 allows a user to create a brewed beverage in accordance with the methods described above in the brew chambers 606. In the illustrative embodiment, the brew chambers 606 are removable from the rack 608 by a user as suggested in FIG. 13. The user empties used brewing substance from the brew chamber 606 after a brew cycle and adds brewing substance to the brew chamber 606 before replacing on the rack 608 for use in a subsequent brew cycle. Brewed beverage formed during the brew cycle can be dispensed through a bottom of the rack 608 or brew chamber 606. In some embodiments, operation of the beverage-delivery system 600 is autonomous with the user engaging the user interface 610 to begin a brew cycle after brewing substance has been added to the brew chamber 606 and the brew chamber 606 has been replaced on the rack 608. In some embodiments, the brewed beverage is brewed at a selective strength, such as a concentrate or ready-to-drink, designated by a user through the user interface 610.

Another embodiment of a beverage-delivery system 700 is shown in FIG. 14. The beverage-delivery system 700 is similar to the beverage-delivery system 500 of FIGS. 8-10, and includes a base 702 and a brew chamber 704 coupled to the base 702. A set of storage shelves 718 are coupled the base 702, and the base 702 is accessible by a user through a front panel as suggested in FIG. 16. One or more dispensers 708 are coupled to the base 702 by a rack 716 for dispensing a brewed beverage formed by the beverage-delivery system 700 as suggested in FIG. 14. A gas supply 712, which illustratively contains nitrogen gas, and a water supply 714 are positioned in the base 702 for use in brewing and dispensing the brewed beverage. In some embodiments, the water supply 714 is chilled or contains ice supplied by a user. The brew chamber 704 is configured to create a brewed beverage in accordance with the methods described above to be dispensed into a holding tank 751. A user adds a brewing substance to brew chamber 704 and then engages a user interface 710 to begin a brew cycle. In the illustrative embodiment, the brew cycle is automated after entry of brewing parameters by the user through the user interface 710. Once the brew cycle is completed, the holding tank 751 can be removed and stored in the base 702 in an array of holding tanks 706 for later dispensing of the brewed beverage through the dispensers 708. In the illustrative embodiment, a single holding tank 706 is connected to a single dispenser 708 as suggested in FIGS. 14 and 15. In some embodiments, a brewed beverage is formed at ready-to-drink strength. In some embodiments, the brewed beverage is formed as a concentrate to be combined with additional water from water supply 714 during dispensing. The user interface 710 also allows a user to dispense brewed beverage from the holding tanks 706 through the dispensers 708. In some embodiments, gas supply 712 pressurizes holding tanks 706 to dispense the brewed beverage. In some embodiments, base 702 is chilled or refrigerated to maintain the temperature of the brewed beverage in the holding tanks 706. In the illustrative embodiment, beverage-delivery system 700 is used to brew batches of brewed beverage for later dispensing as individual servings.

Another embodiment of a beverage-delivery system 800 is shown in FIG. 17. The beverage-delivery system 600 is similar to the beverage-delivery system 600 of FIGS. 11-13, and includes a base 802 and a tower 804 coupled to the base 802. The base 802 is accessible by a user through a front panel as suggested in FIG. 19. A rack 808 is coupled to the tower 804 to hold one or more brew chambers 806 as suggested in FIGS. 17 and 18. The brew chambers 806 are fluidly coupled to a gas supply 812, illustratively containing nitrogen, and a water supply 814 through the rack 808 as suggested in FIG. 17. In some embodiments, the water supply 614 is chilled or contains ice supplied by a user. A user interface 810 allows a user to create a brewed beverage in accordance with the methods described above in the brew chambers 806. In the illustrative embodiment, the brew chambers 806 are removable from the rack 808 by a user as suggested in FIG. 19. The user empties used brewing substance from the brew chamber 806 after a brew cycle and adds brewing substance to the brew chamber 806 before replacing on the rack 808 for use in a subsequent brew cycle. Brewed beverage formed during the brew cycle can be dispensed through a bottom of the rack 808 or brew chamber 806. In some embodiments, operation of the beverage-delivery system 800 is autonomous with the user engaging the user interface 810 to begin a brew cycle after brewing substance has been added to the brew chamber 806 and the brew chamber 806 has been replaced on the rack 808. In some embodiments, the brewed beverage is brewed at a selective strength, such as a concentrate or ready-to-drink, designated by a user through the user interface 810.

The characteristics and benefits described for one of the systems 10, 300, 400 are equally applicable to any of the other systems 10, 300, 400. Each of the disclosed systems 10, 300, 400 maximize the positive extraction characteristics from the brewing substances while minimizing the time to form a brewed beverage therefrom. The systems 10, 300, 400 also maximize automation and control variables of the brewing process to provide efficiency and consistency. Timing, pressures, size of components, and types of brewing substances, including levels of grind thereof, can all affect the characteristics of the final brewed beverage, and all of these variables can be controlled as desired.

Another embodiment of a cold brew system 900 used to form a brewed beverage from a brewing substance is shown in FIG. 20. In the illustrative embodiment, the cold brew system 900 is sized to be hand-held by a user during operation of the cold brew system 900. The cold brew system includes a container 912 defining a brew chamber 914 therein and a closure 916 configured to couple with the container to close an opening 918 into the brew chamber 914 as suggested in FIG. 21. A neck 920 of the container 912 defines the opening 918 and is formed to include threads for engaging with the closure 916, though other engagement means are possible. A filter insert 911 extends through the opening 918 and the closure 916 engages with the neck 920 to trap the filter insert between the container 912 and the closure 916.

Figure 22:
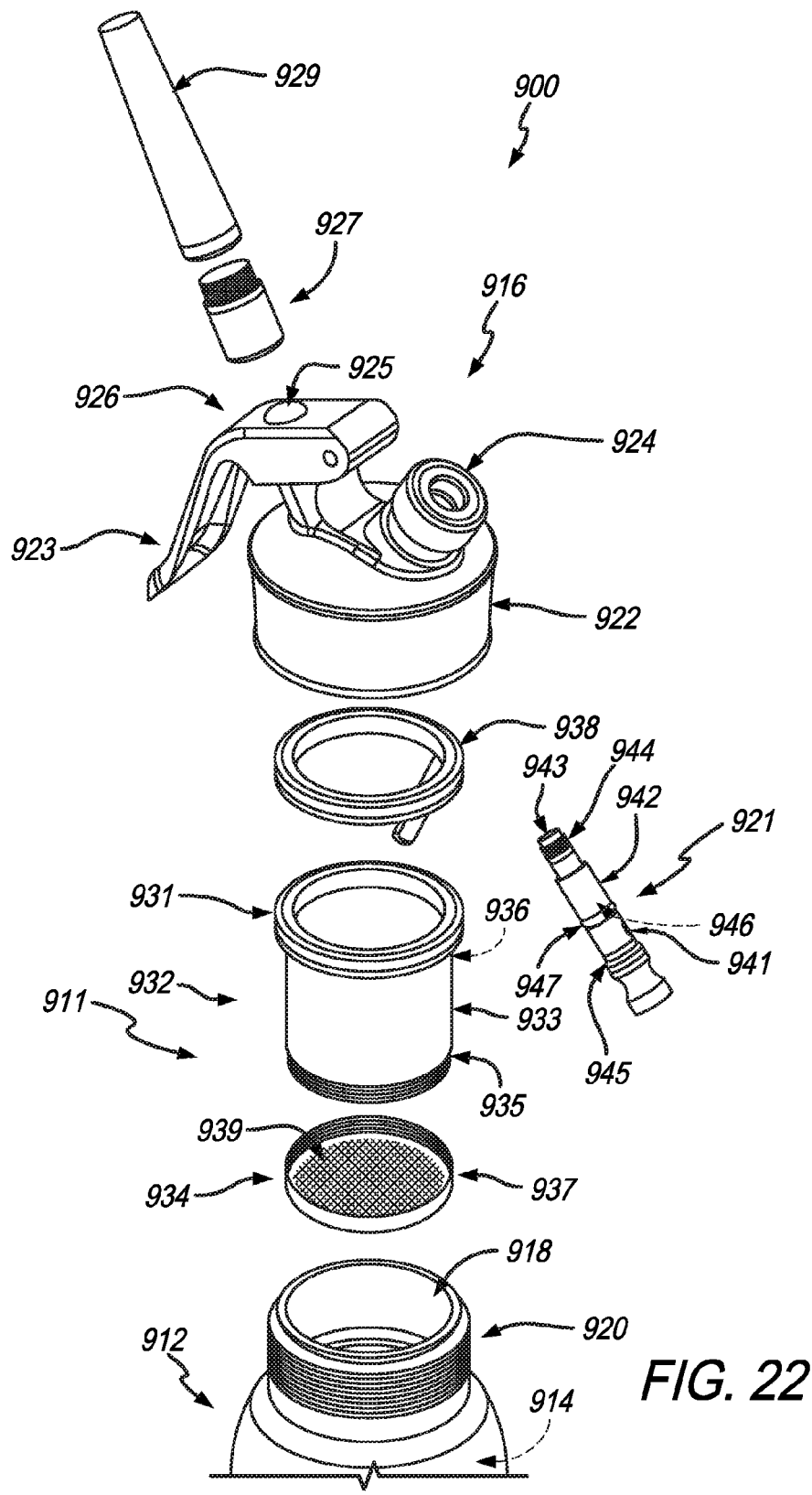
FIG. 22 is an exploded perspective view of the cold brew system of FIG. 21.

The closure 916 includes a lid 922, a gas inlet 924 coupled to the lid 922, and a dispense controller 926 also coupled to the lid 922 as shown in FIG. 22. The dispense controller 926 includes a valve 921 and a valve mover 923. The lid is formed to include a valve receiver 925 configured to receive the valve 921. In the illustrative embodiment, the valve mover 923 is pivotably coupled to the lid 922 to engage with the valve 921 to move the valve 921 relative to the lid 922 to control dispensing of the brewed beverage formed in the brew chamber 914 at the selection of a user. The valve 921 is received in the valve receiver 925 and extends through the valve mover 923 to couple with an adapter 927 to hold the valve 921 on the lid 922. The adapter 927 is configured to couple with a spout 929 to direct the flow of the dispensed brewed beverage. The adapter 927 allows various types of spouts to be attached to the closure. For example, in some embodiments, a "stout beer" style spout, having an elongated outlet neck and integrated orifice, is coupled to the adapter 927.

The filter insert 911 includes a collar 932 and a filter element 934 as suggested in FIG. 22. The filter element 934 couples with the collar 932 which is received in the opening 918 of the container 912 to block brewing substance contained in the brew chamber 914 from passing out of the opening 918. An annular gasket 936 retained on the collar 932 seals with an inner surface of the neck 920 to block solid or fluid material from passing around the filter insert 911 and out of the opening 918. The filter element 934 allows fluid to pass out of the opening 918 while blocking solid materials above a predetermined particle size. A head gasket 938 is coupled between the filter insert 911 and the closure 916 to form seals therewith and block solid or fluid material from passing out of the container 912 between the filter insert 911 and the closure 916.

The collar includes a flange 931, a sleeve 933, and a coupler 935 as shown in FIG. 22. The flange 931 is sized to engage with an upper rim of the neck 920 to block the filter insert 911 from passing through the neck 920 and into the brew chamber 914. The sleeve 933 is sized to pass through the opening 918. The coupler 935 is configured to engage with the filter element 934 to hold the filter element 934 on the collar 932. In some embodiments, filter element 934 and collar 932 are coupled by threads, though other connections are possible. The filter element 934 includes a ring 937 and a screen 939 coupled to the ring 937. The ring 937 is configured to engage with the coupler 935 of the collar 932. The screen 939 is configured to allow fluid to pass therethrough while blocking solid materials above a predetermined particle size. In some embodiments, the screen 939 is formed by etching holes through a metal plate.

The valve 921 includes a stem 942, a tip 944, and a valve passageway 946 as suggested in FIG. 22. The valve passageway 946 extends through an interior of the stem 942 toward the tip 944. An aperture 941 extends through an outer surface of the stem 942 into the valve passageway 946. An aperture 943 extends through a distal end of the tip 944 into the valve passageway 946. The aperture 941 is in fluid communication with the aperture 943 through the valve passageway 946. An annular gasket 947 extends around the stem 942 between the aperture 941 and tip 944. An annular gasket 945 extends around the stem 942 on an opposite side of the aperture 941 from the gasket 947. The adapter 927 engages with the tip 944 to allow fluid communication of the aperture 941 with the spout 929.

Figure 23:
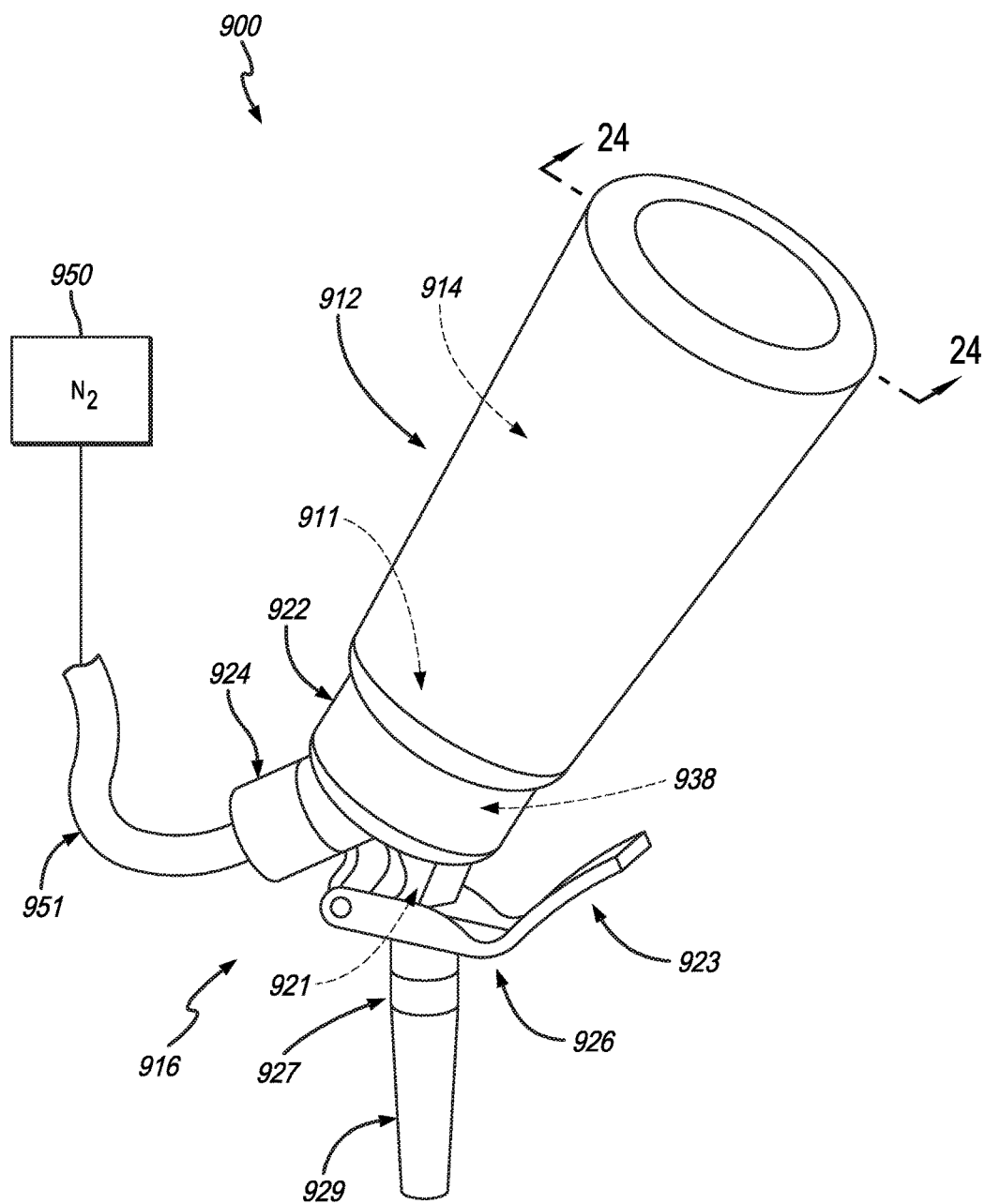
FIG. 23 is a perspective view of the cold brew system of FIG. 20 coupled to a gas supply.

The gas inlet 924 of the closure 916 is configured to fluidly couple with a gas supply 950 through a gas line 951 as suggested in FIG. 23. The gas supply 950 is an external gas supply which can be remotely located from the cold brew system 900. The gas supply 950 can hold a large volume of charging gas to allow for multiple brew cycles in the cold brew system 900 before needing a refill. The gas supply 950 illustratively contains nitrogen gas.

With the closure 916 and filter insert 911 removed from the container 912, a brewing substance 952 and water are added to the brew chamber 914 to begin a brew cycle as suggested in FIG. 21. In some embodiments, the brewing substance 952 is coffee. In some embodiments, the water 954 is at an ambient or below ambient temperature before being added to the brew chamber 914. In some embodiments, ice is added to the brew chamber 914 as part of the brew cycle to chill the brewed beverage being formed. The closure 916 and filter insert 911 can then be mounted on the container 912 to close the brew chamber 914. In some embodiments, the cold brew system 900 is swirled or shaken to mixed the brewing substance 952 with the water 954 to wet down the brewing substance.

Figure 24:
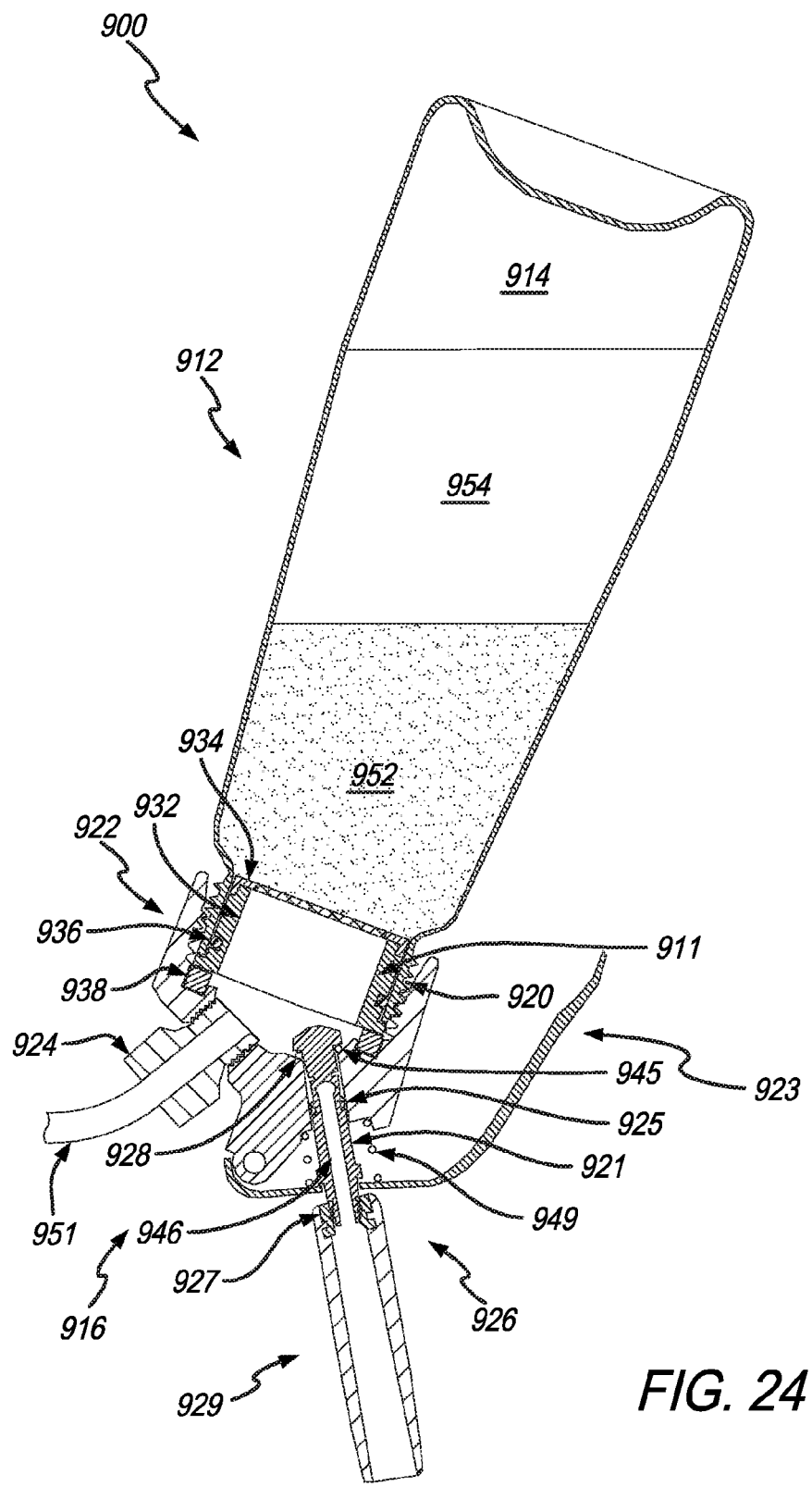
FIG. 24 is a sectional view taken along line 24-24 in FIG. 23.

In the illustrative embodiment, the cold brew system 900 is oriented with the closure 916 facing downward such that the brewing substance 952 collects near the filter insert 911 as suggested in FIG. 24. In a closed position of the valve 921, the gasket 945 retained on the valve 921 engages with and seals against a valve seat 928 formed on the lid 922 to block material in the brew chamber 914 from passing through the valve passageway 946. A spring 949 biases the valve mover 923 away from the container 912 to hold the gasket 945 against the valve seat 928. The brew chamber 914 is at about ambient pressure. In some embodiments, a one-way valve in the gas inlet 924 blocks material in the brew chamber 914 from passing through the gas inlet 924. In some embodiments, pressure within the gas line 951 blocks material in the brew chamber 914 from passing through the gas inlet 924. In some embodiments, the cold brew system 900 is oriented with the closure 916 facing upward such that the water 954 and brewing substance 952 is spaced apart from the filter insert 911 in the brew chamber 914 to allow a user to purge the ambient gases from the brew chamber 914. For example, a user may grip the valve mover to space the gasket 945 from the valve seat 928 to move the valve 921 to an open position to allow fluid flow through the valve 921, and a charging gas from gas supply 950 may flow into the brew chamber 914 through gas inlet 924 to replace the ambient gases with the charging gas.

Figure 25:
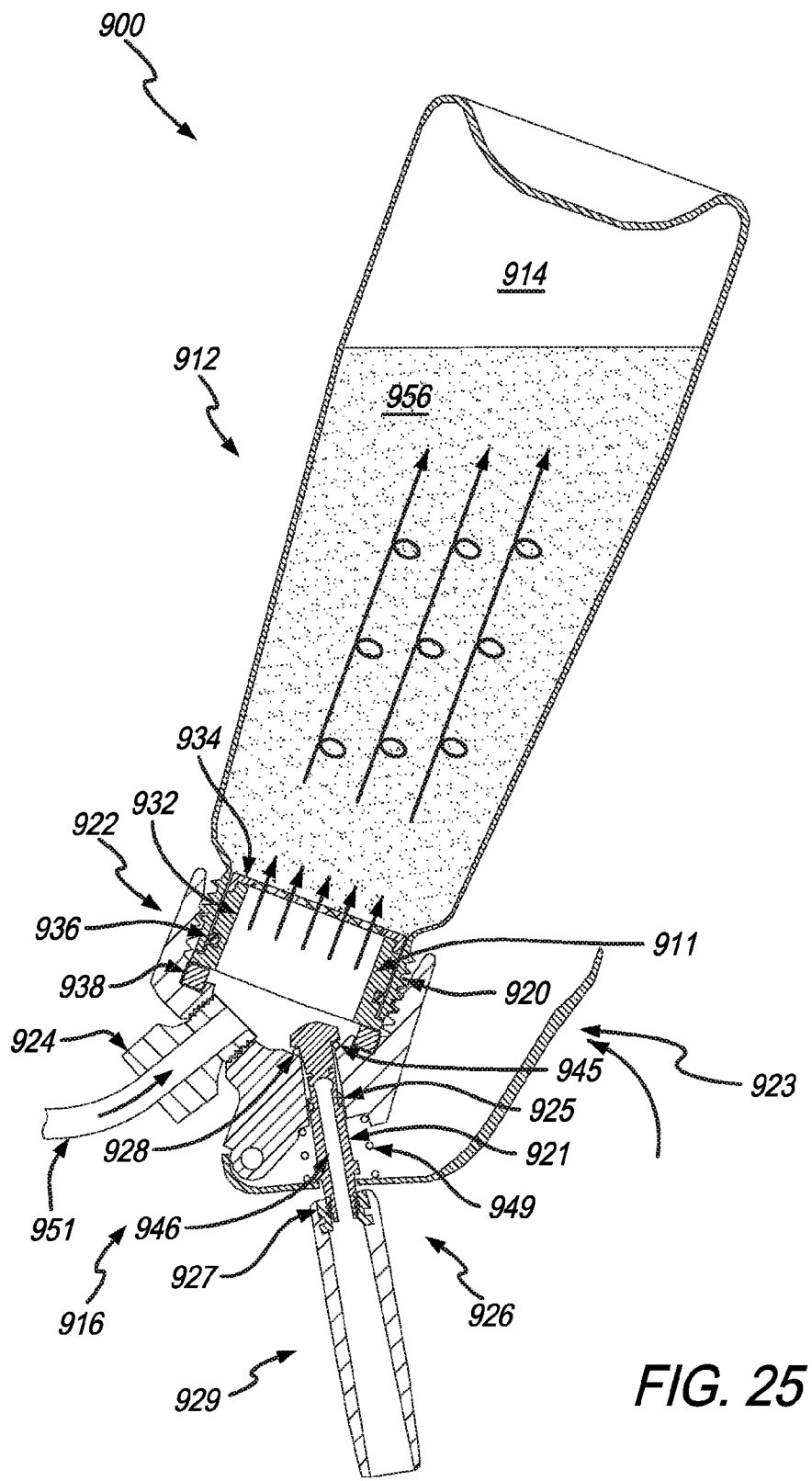
FIG. 25 is a view similar to FIG. 24.

Charging gas from the gas supply 950 is then directed over gas line 951 and through gas inlet 924 to pass through lid 922 as suggested in FIG. 25. The charging gas passes through the filter element 934 and mixes the brewing substance 952 with the water 954 into a slurry 956 as part of a pre-infusion. The gasket 945 of the valve 921 is maintained against the valve seat 928 to allow the brew chamber 914 to become pressurized with the charging gas. In some embodiments, the brew chamber 914 is pressurized to a pressure within a range of about 30 PSI to about 300 PSI. In some embodiments, the cold brew system 900 is maintained in the downward orientation during a brewing period. In some embodiments, the cold brew system 900 is moved to an upward orientation during a brewing period. In the illustrative embodiment, the gas is nitrogen. It has been found that gases other than nitrogen, such as $CO_2$ or $N_2O$ for example, do not form a brewed beverage with the same taste, strength, mouthfeel, perceived flavor characteristics, and other beneficial or preferred characteristics as when nitrogen is used. When using these other gases, flocculation may occur where "strings" of a fibrous nature appear in the resulting brewed beverage after being dispensed.

Figure 26:
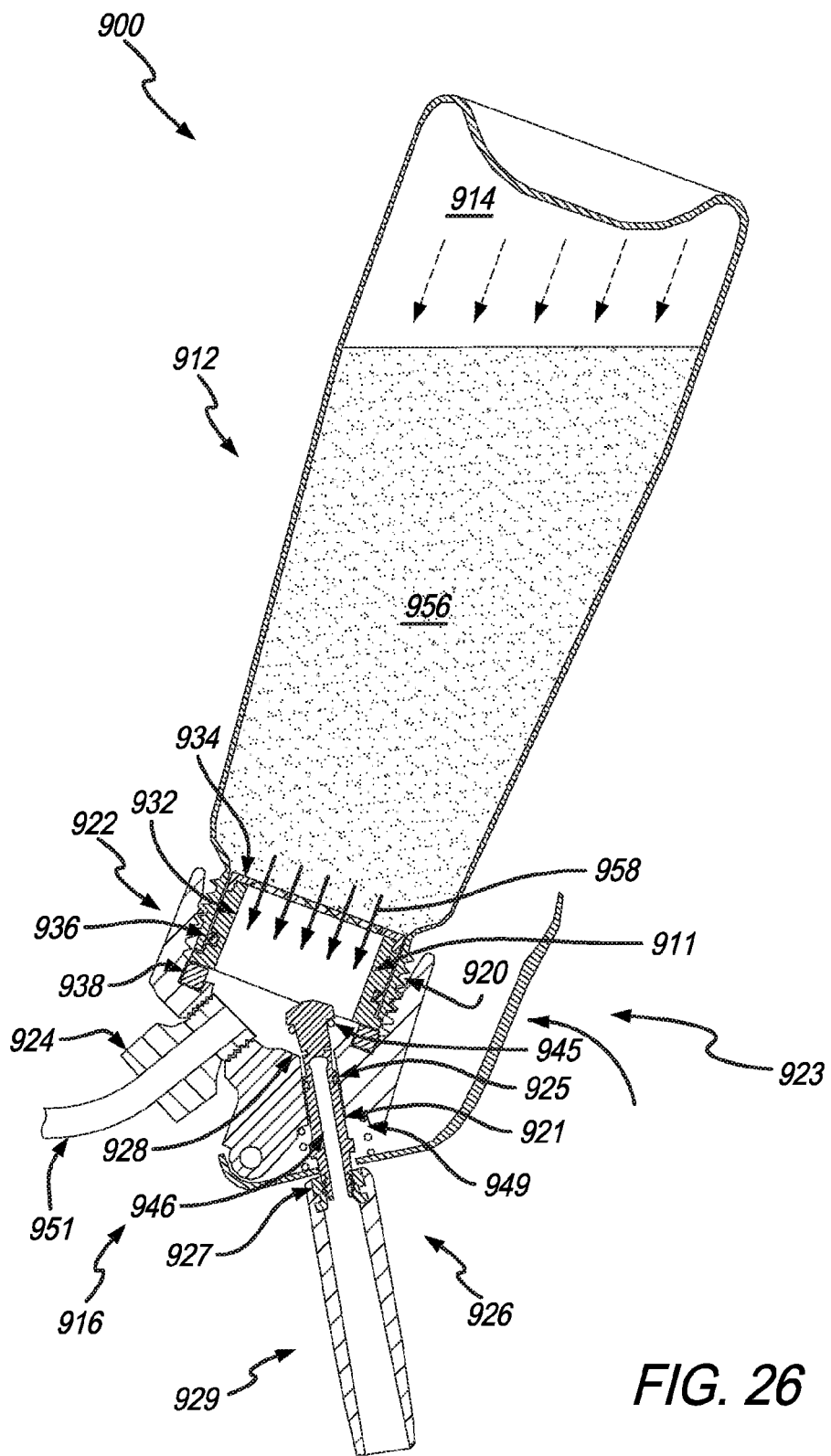
FIG. 26 is a view similar to FIG. 25.

After the brewing period, with the cold brew system 900 in the downward orientation, a user engages the valve mover 923 to space the gasket 945 of the valve 921 from the valve seat 928 to allow the resulting brewed beverage 958 to pass out of the brew chamber 914 through the spout 929 as suggested in FIG. 26. The pressure in the brew chamber 914 forces the brewed beverage 958 through the filter element 934 to separate the brewed beverage 958 from the used brewing substance 952. The gasket 947 of the valve 921 seals against an inner surface of the valve receiver 925 to block the brewed beverage 958 from passing around the valve 921. The brewed beverage 958 flows through the aperture 941, through the valve passageway 946, and out of the aperture 943 into the spout 929. The spout 929 directs the brewed beverage 958 into a receptacle, such as a cup for drinking for example, at the selection of a user.

Figure 27:
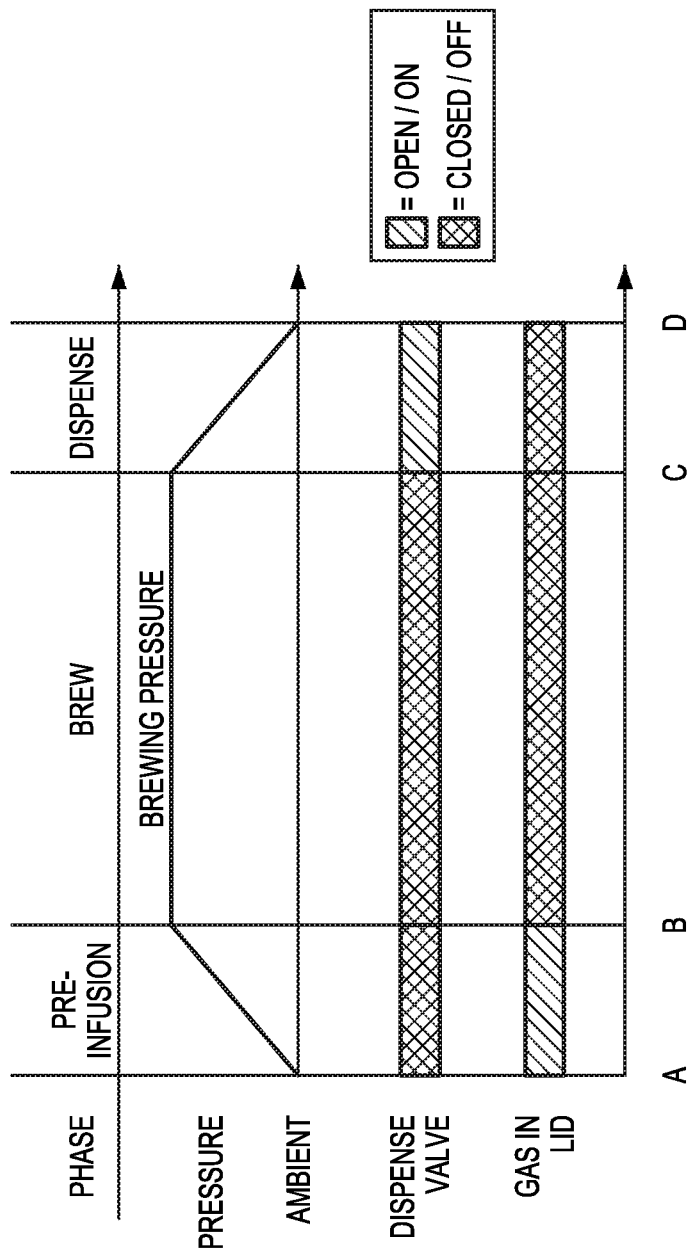
FIG. 27 illustrates one embodiment of a process timeline for use with the cold brew system of FIG. 20.

One embodiment of a process timeline for operating the cold brew system 900 is shown in FIG. 27. The illustrative process starts at point A after the brewing substance 952 and water 954 has been added to the brew chamber 914. The water may be unheated or chilled depending on the associated recipe and configuration of the system. In some embodiments, a controller is used to automate portions of the process, which may include specific input parameters from a user of cold brew system 900.

A "pre-infusion" phase (sometimes called a turbulence or bloom phase) of the process occurs between point A and point B in the timeline as suggested in FIG. 27. In this pre-infusion phase, the valve 921 is in the closed position while charging gas from the gas supply 950 passes through the gas inlet 924 and into the brew chamber 914 to pressurize the brew chamber to a brewing pressure. The cold brew system 900 is oriented with the closure 916 facing downward such that the charging gas passes through the brewing substance 952. The charging gas causes agitation of the brewing substance 952 to maximize interaction with the water 954 and minimize the time needed to form the brewed beverage 958. In some embodiments, a controller connected to the gas supply 950 controls the flow of charging gas into the brew chamber 914. In some embodiments, a user controls the flow of charging gas with a valve coupled to the gas line 951. The flow of charging gas is stopped once the pressure in the brew chamber 914 reaches the brewing pressure.

A "brew" phase of the process occurs between point B and point C in the timeline as suggested in FIG. 27. In the illustrative embodiment, the brewing pressure is maintained substantially constant during the brew phase as suggested in FIG. 27. In some embodiments, the brewing pressure varies throughout the brew phase. For example, outgassing from the brewing substance 952 may increase pressure in the brew chamber 914 during the brew phase. This increase in pressure may be relieved by opening the valve 921 to maintain the brew chamber 914 at a substantially constant pressure with the cold brew system 900 oriented with the closure 916 facing upward so that the liquid in the brew chamber 914 does not pass out of the brew chamber 914. Similarly, in some embodiments, the valve 921 may be used to decrease the pressure of the brew chamber 914 over time during the brew phase.

The pressurizing the brew chamber 914 during the brew phase minimizes the overall brew time to form the brewed beverage 958, such as a few minutes instead of 12-24 hours for example. The pressure may drive both the water and charging gas into the cellular structure of the brewing substance. Then, when they are separated, the brewed beverage carries with it the desired solids and flavors from the brewing substance. In some embodiments, the valve 921 is opened at the end of the brew phase to rapidly decrease the pressure in the brew chamber to a predetermined level. This decrease in pressure can cause a cracking or other breakdown of the cell structure in the brewing substance 952 due to the outgassing of the charging gas supplied by the gas supply 950 from the brewing substance 952. This is especially true of nitrogen which can cause cavitation during rapid decompression. This breakdown can increase the realized extraction from the brewing substance 952 in forming the brewed beverage 958.

A "dispense" phase of the process occurs between point C and point D in the timeline as suggested in FIG. 27. With the cold brew system 900 oriented with the closure 916 facing downward, the valve 921 is opened. The pressure in the brew chamber 914 forces the brewed beverage through the filter element 934 to separate the brewed beverage 958 from the used brewing substance 952. The brewed beverage 958 flows through the valve 921 and into the spout 929 to be directed at the selection of a user. In the illustrative embodiment, the dispense pressure decreases throughout the dispense phase as the brewed beverage 958 is pushed out of the brew chamber 914. In some embodiments, charging gas from gas supply 950 may be introduced through gas inlet 924 to maintain the pressure within the brew chamber 914 as the brewed beverage 958 exits the brew chamber 914. The brewing substance 952 may become packed against the filter element 934, and the pressurized push-through of the brewed beverage may increase the extraction from the brewing substance 952.

After point D, the used brewing substance is removed from the brew chamber 914 to allow the process to restart for brewing a subsequent volume of brewed beverage. The phases shown in FIG. 27 are illustrative and can be shortened or lengthened relative to one another as desired. The timing of each phase can be a recipe control parameter to impact the strength and extraction of the finished brewed beverage. In general, the strength and extraction increases with time.

Generally, as shown in the embodiment characterized by the diagram of FIG. 27, the brewing process from point A to point D takes from about 1 minute to about 5 minutes to complete for a dispense beverage volume of from about 4 OZ to about 20 OZ. Generally, the brewing pressure is within a range from about 80 PSI to about 120 PSI. Generally, the temperature of the water supplied to the brew chamber 914 is less than 80 degrees F., and usually about 40 degrees F. However, other times, pressures, and temperatures are possible without departing from the teachings of the present disclosure. Also, the temperature and volume are dynamic during the brewing process, subject to relatively quick and significant changes in pressure.

In one illustrative recipe, the water to coffee ratio is about 5:1 such that 5 volumes of water are used to each volume of coffee by weight. For example, if about 3 ounces of coffee are added to the brew chamber 914, then about 15 ounces of water are used during the brewing process, and yields about 12 ounces of brewed beverage. The water 954 is dispensed into the brew chamber 914 at about 40 degrees F. Point A to point B in the timeline of FIG. 27 is about 5 seconds to about 15 seconds. Point B to point C is about 1 minute to about 3 minutes. Point C to point D is about 5 seconds to about 15 seconds. The brewing pressure is about 90 PSI to about 110 PSI. This is merely one exemplary recipe provided as an illustration and not as a limitation. This recipe can be modified to controllably change the characteristics of the resulting brewed beverage.

As with the cold brew systems 10, 300, 400 described above, the components of the cold brew system 900 can be configured to match a desired output. For example, various shapes and sizes of screen 939, as well as materials used to form the screen 939, may affect the characteristics of the brewed beverage. Similarly, the sizing of the openings through the valve 921, adapter 927, and spout 929, and shape of spout 929, may affect the characteristics of the brewed beverage. The pressures may also be adjusted up or down.

Figure 28:
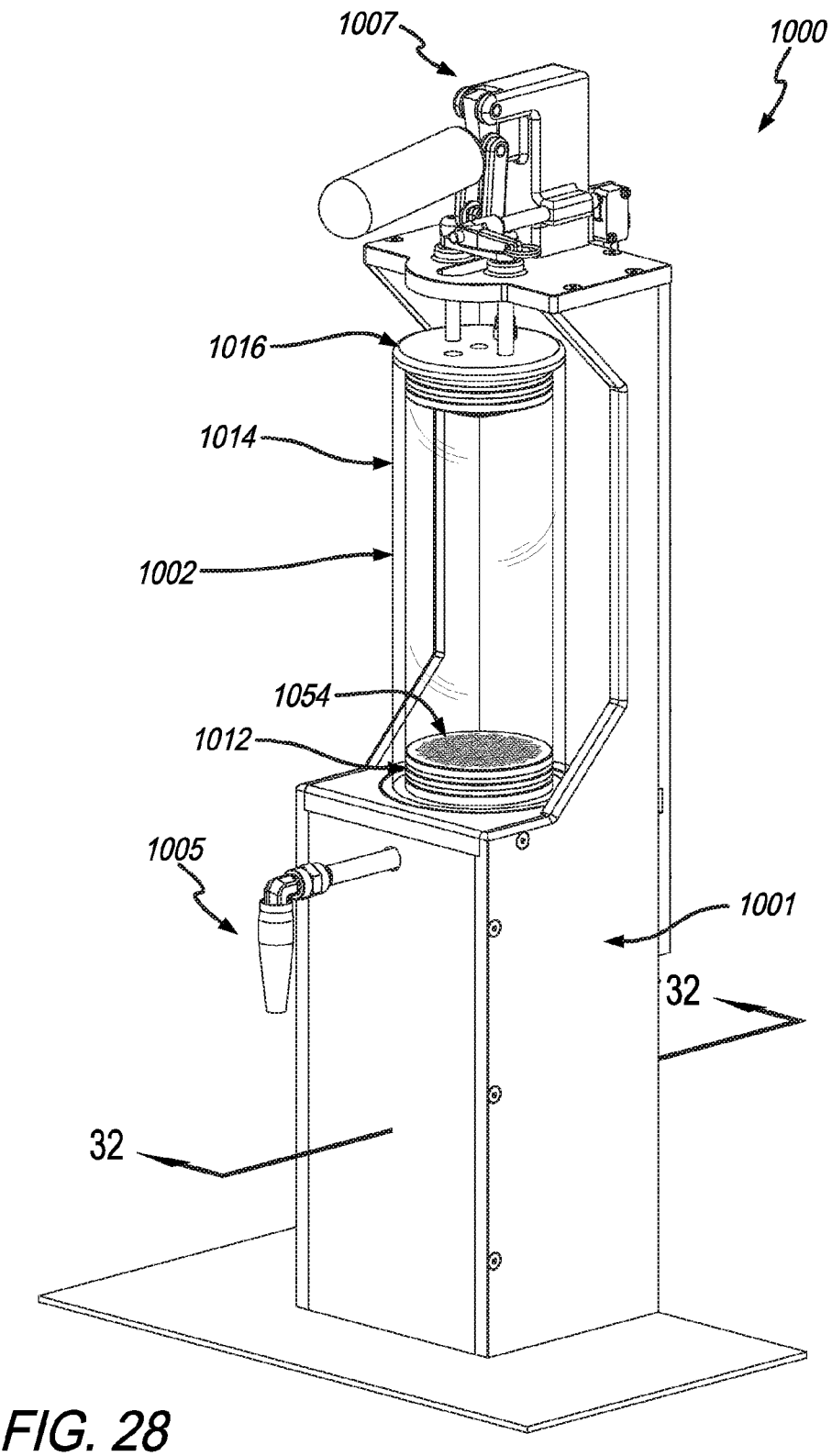
FIG. 28 is a perspective view of another embodiment of a cold brew system which allows for brewing and dispensing of a brewed beverage.

Another embodiment of a cold brew system 1000 is shown in FIG. 28. The cold brew system 1000 illustratively includes a stand 1001, a brew chamber 1002, and a clamp 1007. The clamp 1007 or other securing device cooperates with the stand 1001 to secure the brew chamber 1002 in position. A brewed beverage is formed in the brew chamber 1002 and exits through a filter 1054 of the brew chamber 1002 to be dispensed controllably from a nozzle 1005 at the selection of a user. Seal elements, such as O-rings, are used to seal the brew chamber 1002 for pressurization and to control the flow of brewed beverage.

Figure 29:
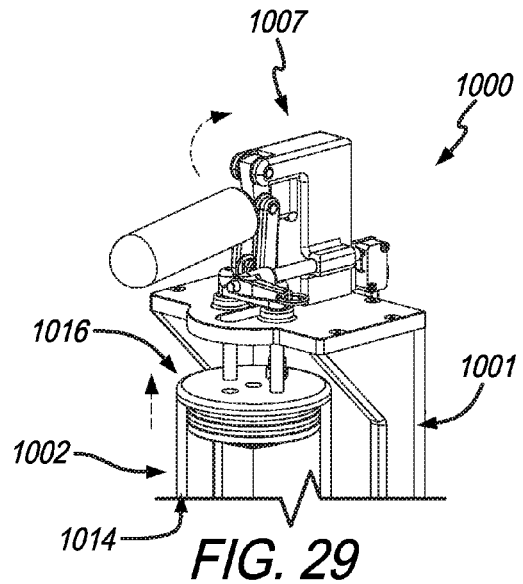
FIG. 29 is an enlarged view of FIG. 28.
Figure 30:
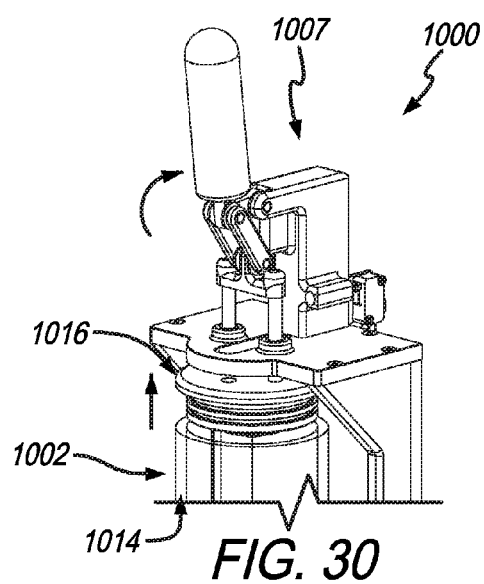
FIG. 30 is a view similar to FIG. 29.

The brew chamber 1002 illustratively includes a base 1012, a sidewall 1014, and a lid 1016 as shown in FIG. 28. The lid 1016 is coupled to the clamp 1007 for selective movement relative to the sidewall 1014 to allow removal of the brew chamber 1002 from the stand as suggested in FIGS. 29-31. A user may then fill the brew chamber 1002 with a brewing substance, such as ground coffee, and replace the brew chamber 1002 on the stand 1001. In some embodiments, ice is added to the brew chamber 1002 as part of the brew cycle to chill the brewed beverage being formed. Water is placed in the brew chamber 1002 to mix with the brewing substance and begin a brew cycle for forming the brewed beverage. In some embodiments, water is placed in the brew chamber 1002 before the lid 1016 is mounted on the sidewall 1014 using the clamp 1007. In some embodiments, water is placed in the brew chamber 1002 after the lid 1016 is mounted on the sidewall 1014 using the clamp 1007.

Figure 31:
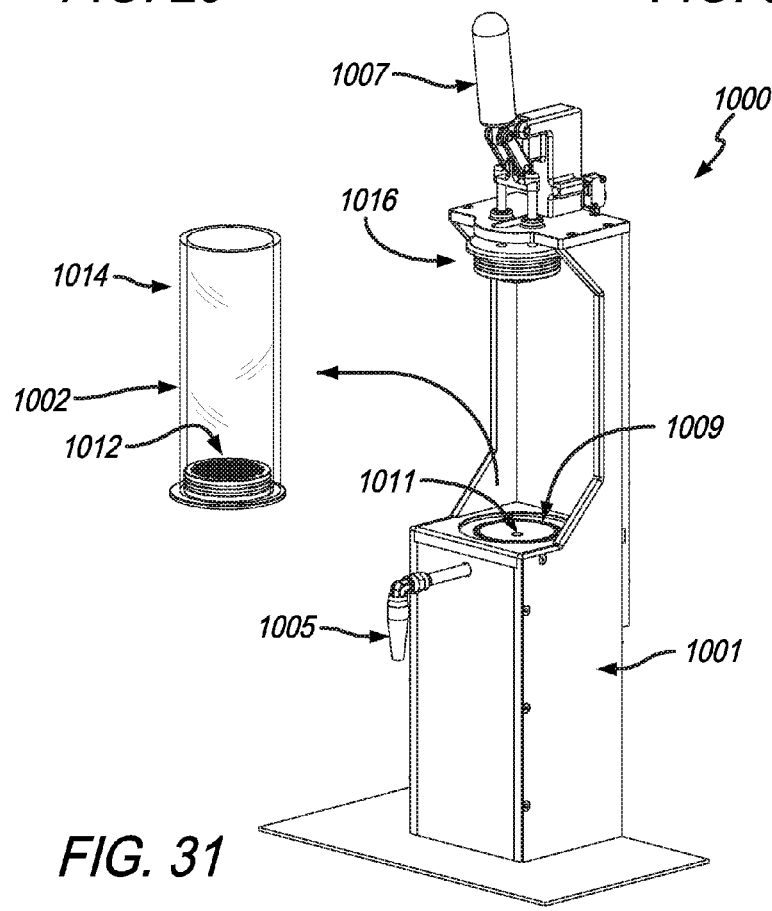
FIG. 31 is a view similar to FIG. 28.
Figure 32:
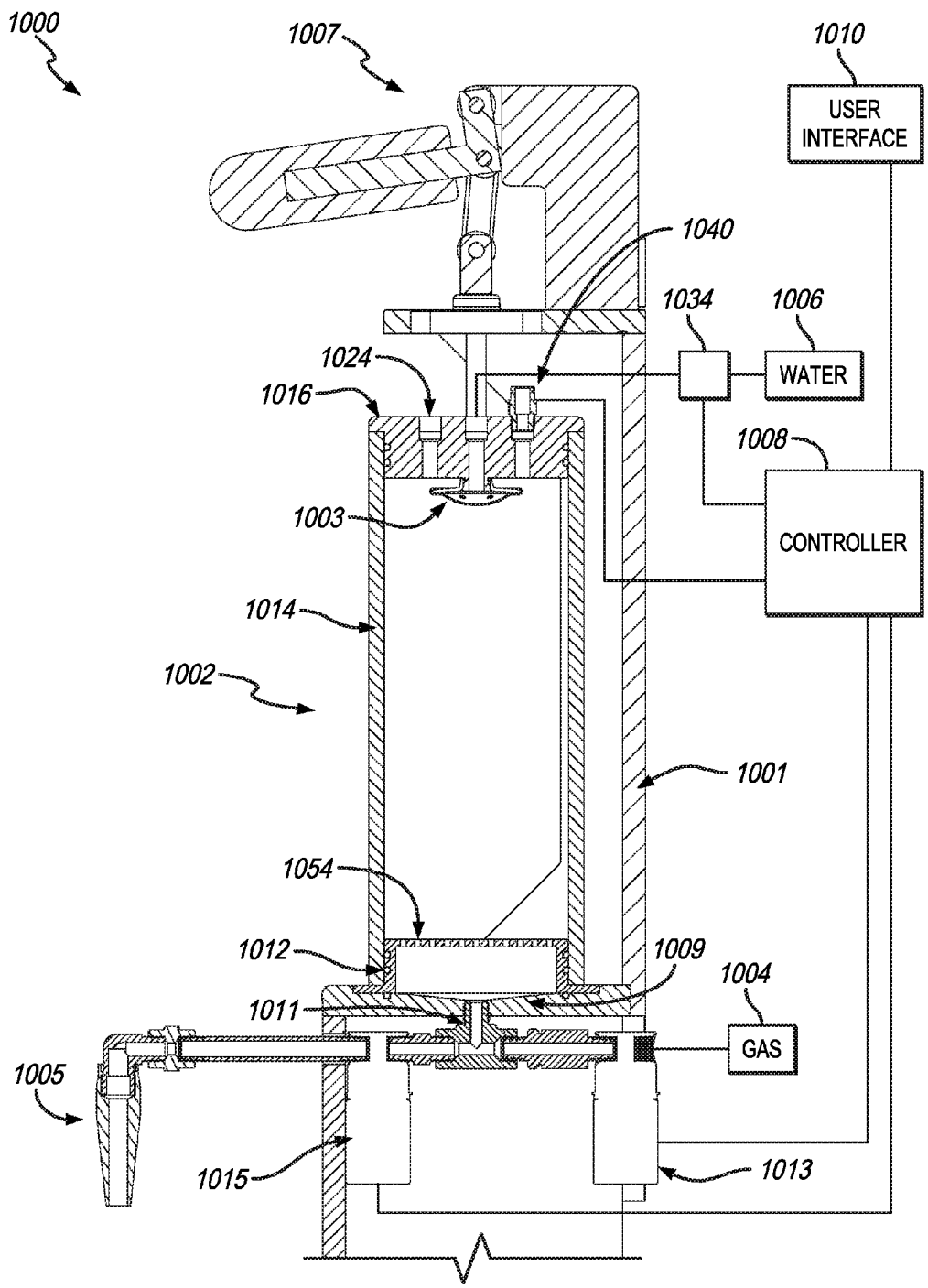
FIG. 32 is a sectional view taken along line 32-32 in FIG. 28 and includes schematic elements associated with the cross-sectional elements.

The base 1012 of the brew chamber 1002 is configured to cooperate with a seat 1009 of the stand 1001 to seal around an opening 1011 as suggested in FIGS. 31 and 32. In the illustrative embodiment, water is controllably supplied by way of a controllable valve 1034 from a water supply 1006 to the brew chamber 1002 and through a spray head 1003 coupled to the lid 1016 as suggested in FIG. 32. A controllable valve 1013 is configured to regulate the supply of gas, such as nitrogen, from a gas supply 1004 to the brew chamber 1002 through the opening 1011. A controllable valve 1015 is configured to selectively allow dispensing of the brewed beverage formed in the brewing chamber 1002 to be dispensed from the nozzle 1005.

In the illustrative embodiment, a controller 1008 may be used to automate portions of the brew process within brew chamber 1002, which may include specific input parameters from a user of cold brew system 1000. For example, the user may add brewing substance to the brew chamber 1002, secure the brew chamber 1002 to the stand 1001, and select a predetermined program of the cold brew system 1000 through a user interface 1010 to begin a brew cycle. The controller 1008 then controls valves 1013, 1015, 1034 to regulate the addition of water and gas to the brew chamber 1002 for forming a brewed beverage from the brewing substance.

In some embodiments, a vent valve 1040 is coupled to the lid 1016 to allow the pressure in the brew chamber 1002 to be controlled. This vent valve 1040 may be an automatic vent that operates at a predetermined pressure or is controllable via the controller 1008. In some embodiments, an inlet port 1024 is formed in the lid to allow gas from gas supply 1004 to flow into the brew chamber 1002 through the lid 1016. In use, the cold brew system 1000 operates in much the same way as the cold brew system 400 described above and shown in FIG. 6. In some embodiments, a similar process timeline to that described above and shown in FIG. 7 is used in the cold brew system 1000. As with the cold brew systems 10, 300, 400, 900 described above, the components of the cold brew system 1000 can be configured to match a desired output. The descriptions of the cold brew systems 10, 300, 400, 900 above apply with equal force to the cold brew system 1000.

In some embodiments, coffee beans grown in Ethiopia and the surrounding areas exhibit beneficial characteristics when used to brew a beverage with the processes disclosed herein.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

What is claimed is:

1. A beverage brewing system comprising:
   a container defining a brew chamber adapted to receive a brewing substance, a neck of the container defining an opening into the brew chamber;
   a closure having a lid configured to engage with the neck of the container to hold the closure on the container, a gas inlet configured to pass a flow of nitrogen gas into the brew chamber of the container, and a dispense controller configured to selectively block or allow a flow of liquid from the brew chamber; and
   a filter insert configured to engage with the neck of the container to cover the opening into the brew chamber and block the brewing substance within the brew chamber from passing out of the opening,
   wherein the filter insert includes a collar configured to seal against the neck of the container and a filter element coupled to the collar.

2. The beverage brewing system of claim 1, wherein the dispense controller includes a valve configured to engage with the lid to block a flow through the valve, a valve mover configured to move the valve relative to the lid at the selection of a user to allow a flow through the valve, and a spout coupled to the valve.

3. The beverage brewing system of claim 1, further comprising a gasket engaged with the lid and the collar to seal the brew chamber for pressurization.

4. A beverage brewing system comprising:
   a brew chamber adapted to be pressurized;
   a filter associated with the brew chamber and adapted to filter at least a portion of a brewing substance within the brew chamber;
   a controller for controlling the operation of the beverage brewing system;
   a controllable water delivery system coupled to the controller and communicating with the brew chamber for controllably delivering a volume of unheated brew water to the brew chamber;
   a nitrogen gas delivery system coupled to the controller and communicating with the brew chamber, the nitrogen gas delivery system configured to controllably deliver nitrogen gas to the brew chamber through the filter to agitate brewing substance in the chamber, create a nitrogen rich brewing environment in the brew chamber, and to controllably pressurize the brew chamber during a brew cycle, brew water mixing with the brewing substance to produce a brewed beverage in the nitrogen rich environment, and the nitrogen gas delivery system controllably maintaining a pressure lower than brewing pressure and higher than ambient pressure while dispensing brewed beverage from the chamber through the filter.

5. The beverage brewing system of claim 4, further comprising a valve unit coupled to the brew chamber and configured to selectively block or allow a flow of liquid out of the brew chamber through the filter.

6. The beverage brewing system of claim 5, wherein the valve unit is further configured to selectively block or allow a flow of nitrogen gas into the brew chamber through the filter.

7. The beverage brewing system of claim 4, further comprising a vent valve coupled to the brew chamber and configured to selectively block or allow a flow of gas out of the brew chamber.

8. The beverage brewing system of claim 4, further comprising a dispense spout in fluid communication with the brew chamber and including an elongated neck with an integrated orifice.

9. The beverage brewing system of claim 4, further comprising a stand and a clamp.

10. The beverage brewing system of claim 9, wherein the clamp is configured to selectively block or allow removal of the brew chamber from the stand.

* * * * *